US007899742B2

(12) United States Patent
Benkert et al.

(10) Patent No.: US 7,899,742 B2
(45) Date of Patent: Mar. 1, 2011

(54) SYSTEM AND METHOD FOR FACILITATING A SUBSIDIARY CARD ACCOUNT

(75) Inventors: Marc Benkert, Phoenix, AZ (US); Chris Hobbs, Singapore (SG); Kazuhiko Okamoto, Tokyo (JP); Grace Park, New York, NY (US); Tomer Rubinshtein, Tel Aviv (IL)

(73) Assignee: American Express Travel Related Services Company, Inc., New York, NY (US)

( * ) Notice: Subject to any disclaimer, the term of this patent is extended or adjusted under 35 U.S.C. 154(b) by 1971 days.

(21) Appl. No.: 10/600,483

(22) Filed: Jun. 19, 2003
(Under 37 CFR 1.47)

(65) Prior Publication Data
US 2004/0143527 A1 Jul. 22, 2004

Related U.S. Application Data

(63) Continuation-in-part of application No. 10/155,332, filed on May 23, 2002, now Pat. No. 7,401,049, and a continuation-in-part of application No. 10/128,949, filed on Apr. 23, 2002, now Pat. No. 6,796,497.

(60) Provisional application No. 60/294,107, filed on May 29, 2001.

(51) Int. Cl.
*G06Q 40/00* (2006.01)
(52) U.S. Cl. .................. 705/39; 705/41; 705/42
(58) Field of Classification Search .......... 235/379, 235/380; 705/35, 39, 40
See application file for complete search history.

(56) References Cited

U.S. PATENT DOCUMENTS

| 3,702,392 A | * | 11/1972 | St. Jean ................. 235/380 |
| 4,712,243 A | | 12/1987 | Ninomiya et al. |
| 4,837,422 A | * | 6/1989 | Dethloff et al. ............ 235/380 |
| 4,961,229 A | | 10/1990 | Takahashi |
| 5,025,372 A | | 6/1991 | Burton et al. |
| 5,027,407 A | | 6/1991 | Tsunoda |

(Continued)

FOREIGN PATENT DOCUMENTS
WO 03048882 6/2003

OTHER PUBLICATIONS

Marlin, Steven. "Card processor brings CRM to account manager." Bank Systems & Technology, v37, n5 pp. 58, May 2000.*

(Continued)

*Primary Examiner* — James A Kramer
*Assistant Examiner* — Martin A Gottschalk
(74) *Attorney, Agent, or Firm* — Snell & Wilmer L.L.P.

(57) ABSTRACT

The present invention provides a system and method for providing a flexible limit subsidiary account that may be issued by a Foreign Financial Institution. In particular, the present provides a system and method for allowing a parent to provide funds to a subsidiary and to control the spending of subsidiary or spending capacity. The card account may be issued at the request of the parent who may retain the ability to define, modify, and/or terminate the spending and/or debt accumulation limits for the subsidiary card account as well as other features as described in the attached disclosure. The system may be configured to provide the ability for parent to eliminate risks associated with fluctuations in currency exchange rates by committing to fixed automatic long-term charges at a fixed foreign exchange rate for a fixed term.

18 Claims, 5 Drawing Sheets

U.S. PATENT DOCUMENTS

| | | | |
|---|---|---|---|
| 5,046,157 A | 9/1991 | Smith et al. | |
| 5,054,083 A | 10/1991 | Naik et al. | |
| 5,177,342 A | 1/1993 | Adams | |
| 5,264,689 A | 11/1993 | Maes | |
| 5,265,191 A | 11/1993 | McNair | |
| 5,287,269 A | 2/1994 | Dorrough et al. | |
| 5,321,241 A | 6/1994 | Craine | |
| 5,329,609 A | 7/1994 | Sanada et al. | |
| 5,350,906 A * | 9/1994 | Brody et al. | 235/379 |
| 5,477,038 A * | 12/1995 | Levine et al. | 235/380 |
| 5,485,510 A | 1/1996 | Colbert | |
| 5,500,513 A | 3/1996 | Langhans et al. | |
| 5,577,109 A | 11/1996 | Stimson | |
| 5,608,784 A | 3/1997 | Miller | |
| 5,621,201 A | 4/1997 | Langhans et al. | |
| 5,631,947 A | 5/1997 | Wittstein et al. | |
| 5,708,422 A * | 1/1998 | Blonder et al. | 340/5.41 |
| 5,712,473 A | 1/1998 | Nagashio | |
| 5,760,381 A | 6/1998 | Stich | |
| 5,777,305 A | 7/1998 | Smith | |
| 5,802,251 A | 9/1998 | Cohen et al. | |
| 5,845,260 A | 12/1998 | Nakano et al. | |
| 5,864,830 A | 1/1999 | Armetta et al. | |
| 5,865,470 A | 2/1999 | Thompson | |
| 5,878,134 A | 3/1999 | Handelman et al. | |
| 5,878,337 A | 3/1999 | Joao et al. | |
| 5,893,057 A | 4/1999 | Fujimoto et al. | |
| 5,893,907 A | 4/1999 | Ukuda | 705/35 |
| 5,903,830 A * | 5/1999 | Joao et al. | 455/406 |
| 5,907,831 A | 5/1999 | Lotvin et al. | |
| 5,914,472 A | 6/1999 | Foladare et al. | |
| 5,937,395 A | 8/1999 | Iwamura | |
| 5,940,476 A | 8/1999 | Morganstein et al. | |
| 5,953,710 A | 9/1999 | Fleming | |
| RE36,365 E | 11/1999 | Levine | |
| 5,991,413 A | 11/1999 | Arditti | |
| 5,991,748 A | 11/1999 | Taskett | |
| 5,991,750 A | 11/1999 | Watson | |
| 5,999,596 A * | 12/1999 | Walker et al. | 379/91.01 |
| 6,000,608 A | 12/1999 | Dorf | |
| 6,012,635 A | 1/2000 | Shimada | |
| 6,021,943 A | 2/2000 | Chastain | |
| 6,023,682 A | 2/2000 | Checchio | |
| 6,032,134 A | 2/2000 | Weissman | |
| 6,032,136 A | 2/2000 | Brake, Jr. | |
| 6,032,859 A | 3/2000 | Muehlberger | |
| 6,044,360 A | 3/2000 | Picciallo | |
| 6,045,050 A | 4/2000 | Ippolito | |
| 6,047,270 A | 4/2000 | Joao et al. | |
| 6,052,675 A | 4/2000 | Checchio | |
| 6,062,472 A | 5/2000 | Cheung | |
| 6,064,986 A | 5/2000 | Edelman | |
| 6,101,477 A | 8/2000 | Hohle | |
| 6,105,008 A | 8/2000 | Davis | |
| 6,128,602 A | 10/2000 | Northington et al. | |
| 6,145,741 A | 11/2000 | Wisdom | |
| 6,161,090 A | 12/2000 | Kanevsky et al. | |
| 6,173,269 B1 * | 1/2001 | Solokl et al. | 705/35 |
| 6,182,895 B1 | 2/2001 | Albrecht | |
| 6,185,545 B1 | 2/2001 | Resnick et al. | |
| 6,189,787 B1 | 2/2001 | Dorf | |
| 6,205,204 B1 | 3/2001 | Morganstein et al. | |
| 6,219,639 B1 | 4/2001 | Bakis et al. | |
| 6,226,624 B1 | 5/2001 | Watson et al. | |
| 6,263,311 B1 | 7/2001 | Dildy | |
| 6,266,640 B1 | 7/2001 | Fromm | |
| 6,267,292 B1 | 7/2001 | Walker et al. | |
| 6,282,268 B1 | 8/2001 | Hughes et al. | |
| 6,292,782 B1 | 9/2001 | Weideman | |
| 6,304,860 B1 * | 10/2001 | Martin et al. | 705/43 |
| 6,327,348 B1 | 12/2001 | Walker et al. | |
| 6,356,868 B1 | 3/2002 | Yuschik et al. | |
| 6,401,066 B1 | 6/2002 | McIntosh | |
| 6,422,462 B1 | 7/2002 | Cohen | |
| 6,463,412 B1 | 10/2002 | Baumgartner et al. | |
| 6,505,772 B1 | 1/2003 | Mollett et al. | |
| 6,510,415 B1 | 1/2003 | Talmor et al. | |
| 6,519,565 B1 | 2/2003 | Clements et al. | |
| 6,526,126 B1 | 2/2003 | Morganstein et al. | |
| 6,529,725 B1 | 3/2003 | Joao et al. | |
| 6,529,871 B1 | 3/2003 | Kanevsky et al. | |
| 6,529,881 B2 | 3/2003 | Morganstein et al. | |
| 6,892,184 B1 * | 5/2005 | Komem et al. | 705/26 |
| 7,050,996 B1 * | 5/2006 | Blagg et al. | 705/30 |
| 7,295,999 B1 * | 11/2007 | Simon et al. | 705/36 R |
| 2001/0047336 A1 | 11/2001 | Maycock, Jr. et al. | |
| 2001/0051917 A1 | 12/2001 | Bissonette et al. | |
| 2002/0016769 A1 * | 2/2002 | Barbara et al. | 705/40 |
| 2002/0025797 A1 | 2/2002 | Joao et al. | |
| 2002/0082962 A1 * | 6/2002 | Farris et al. | 705/35 |
| 2002/0095386 A1 | 7/2002 | Maritzen et al. | |
| 2002/0097715 A1 * | 7/2002 | Roerick | 370/389 |
| 2002/0099635 A1 | 7/2002 | Guiragosian | |
| 2002/0099656 A1 * | 7/2002 | Poh Wong | 705/40 |
| 2002/0123938 A1 | 9/2002 | Yu et al. | |
| 2002/0152158 A1 | 10/2002 | Paleiov et al. | |
| 2002/0165777 A1 | 11/2002 | Lotvin et al. | |
| 2002/0174016 A1 | 11/2002 | Cuervo | |
| 2002/0174030 A1 | 11/2002 | Praisner et al. | |
| 2002/0194079 A1 | 12/2002 | Kimble | |
| 2002/0198806 A1 | 12/2002 | Blagg et al. | |
| 2003/0023440 A1 | 1/2003 | Chu | |
| 2003/0028481 A1 | 2/2003 | Flitcroft et al. | |
| 2003/0037004 A1 | 2/2003 | Buffum et al. | |
| 2003/0046083 A1 | 3/2003 | Devinney, Jr. et al. | |
| 2003/0055786 A1 | 3/2003 | Smith, Jr. et al. | |
| 2003/0061170 A1 * | 3/2003 | Uzo | 705/64 |
| 2004/0107152 A1 * | 6/2004 | Marlowe-Noren | 705/35 |

OTHER PUBLICATIONS

USPTO; Notice of Allowance dated May 7, 2007 in U.S. Appl. No. 10/628,034.

USPTO; Advisory Action dated Dec. 26, 2006 in U.S. Appl. No. 10/628,034.

USPTO; Final Office Action dated Oct. 6, 2006 in U.S. Appl. No. 10/628,034.

USPTO; Office Action dated Apr. 18, 2006 in U.S. Appl. No. 10/628,034.

USPTO; Advisory Action dated Feb. 6, 2006 in U.S. Appl. No. 10/628,034.

USPTO; Final Office Action dated Nov. 16, 2005 in U.S. Appl. No. 10/628,034.

USPTO; Office Action dated Jul. 27, 2005 in U.S. Appl. No. 10/628,034.

USPTO; Advisory Action dated Feb. 23, 2005 in U.S. Appl. No. 10/628,034.

USPTO; Final Office Action dated Dec. 15, 2004 in U.S. Appl. No. 10/628,034.

USPTO; Office Action dated Aug. 26, 2004 in U.S. Appl. No. 10/628,034.

"Florida Attorney Patents Smart Card Business Process." Card News. Potomac: Apr. 5, 2000. vol. 15, Issue 7, p. 1.

USPTO; Office Action dated Oct. 10, 2007 in U.S. Appl. No. 10/155,332.

USPTO; Advisory Action dated Jul. 5, 2007 in U.S. Appl. No. 10/155,332.

USPTO; Final Office Action dated Apr. 11, 2007 in U.S. Appl. No. 10/155,332.

USPTO; Office Action dated Oct. 12, 2006 in U.S. Appl. No. 10/155,332.

USPTO; Advisory Action dated Jul. 3, 2006 in U.S. Appl. No. 10/155,332.

USPTO; Final Office Action dated Mar. 21, 2006 in U.S. Appl. No. 10/155,332.

USPTO; Office Action dated Sep. 30, 2005 in U.S. Appl. No. 10/155,332.

USPTO; Office Action dated Mar. 31, 2003 in U.S. Appl. No. 10/128,949.

USPTO; Notice of Allowance dated Nov. 3, 2003 in U.S. Appl. No. 10/128,949.
PCT; International Search Report dated Apr. 11, 2003 in Application No. PCT/US02/16745.
PCT; Written Opinion dated Dec. 24, 2003 in Application No. PCT/US03/12512.

PCT; International Search Report dated Sep. 23, 2003 in Application No. PCT/US03/12512.

\* cited by examiner

SYSTEM AND METHOD FOR FACILITATING A SUBSIDIARY CARD ACCOUNT

CROSS-REFERENCE TO RELATED APPLICATIONS

This patent application is a continuation in part of U.S. nonprovisional patent application Ser. No. 10/155,332 filed May, 23, 2002 now U.S. Pat. No. 7,401,049 and entitled "SYSTEM AND METHOD FOR A PREPAID CARD ISSUED BY A FOREIGN FINANCIAL INSTITUTION," which claims priority to, and the benefit of, the U.S. provisional patent application Ser. No. 60/294,107 filed on May 29, 2001, both of which are hereby incorporated by reference. This patent application is also a continuation in part of U.S. nonprovisional patent application Ser. No. 10/128,949, filed Apr. 23, 2002 now U.S. Pat. No. 6,796,497 and entitled "SYSTEM AND METHOD FOR FACILITATING A SUBSIDIARY CARD ACCOUNT," which is also hereby incorporated by reference.

FIELD OF INVENTION

The present invention relates generally to systems for facilitating transactions, and more specifically to systems for facilitating financial services at the request of a first party for the use of a second party such that the first party may define, modify, and/or terminate the spending capacity accorded the second party.

BACKGROUND OF INVENTION

Many financial institutions are providing plastic stored-value cards (e.g. debit cards, telephone calling cards, loyalty cards, etc.) that can be used in lieu of cash. To enable a stored value card to supply spending capacity, a user transfers an amount of value to the issuing institution, which stores or credits a corresponding amount of value to the user's account, allowing the value to be spent by the card user, thereby providing spending capacity to the card user. The value may be transferred to the issuing institution in a variety of ways such as on-line transfers from bank accounts or credit cards. The stored value cards then can be used to pay for items in stores or on-line, and to withdraw cash at automated teller machines (ATMs). The stored value cards appear to function like credit cards, but they often extend little or no credit to the user, so the cards do not substantially enable users to finance their transactions.

Some people or entities may be unable, or may not desire, to acquire traditional credit cards (e.g., teenagers, college students, employees, financially insecure or dependent consumers, or others lacking sufficient credit history, permanent income, or age). These parties, however, often desire the alternative of stored value cards for the convenience and prestige they provide. Those who are responsible for such consumers (e.g., parents, guardians, employers, and the like) often desire stored value cards because they provide a convenient mechanism for disbursing financial support to their employees and/or dependents. For example, stored value cards often enable parents to add value to the cards on-line, remote from a dependant who may be away at college, traveling abroad, or residing with a different guardian. Similarly, companies may desire to use stored value cards to enable employees to make expenditures for travel, supplies, or other business related expenses or may even use such financial vehicles for payment of wages, salary, or bonuses. To many parents, stored value cards also provide a useful teaching aid through which dependants may practice skills such as budgeting, saving, disciplined spending and/or management of credit.

In addition to controlling and/or monitoring the spending habits of subsidiaries (i.e., students, dependents, employees), parents often desire to provide security for their children to prepare for contingencies that may arise such as a need for emergency medical care. At the same time, however, those parents may not wish that their children have general access to funds for non-emergencies. Unfortunately, however, many existing credit cards do not provide a convenient mechanism for permitting a user access to a limited set of goods or services or providers of same while limiting their access to other goods or services.

Stored value cards also provide parents the ability to track and control the spending and/or accumulation of debt by their dependants. For example, some stored value cards provide parents with access to on-line databases that allow review of information about how much and where their dependents spent the value stored on their cards. Dependants also often appreciate the tracking capability because it provides a convenient record not readily available with purely cash transactions.

Some cards are available that enable parents to prevent the cards from being used by the dependent to purchase goods and/or services from specific merchants or classes of merchants (e.g., those who sell pornography, tobacco and alcohol, or other forbidden goods or services). For example, American Express' Cobalt card enables the blocking of purchases from on-line retailers that sell pornography, tobacco and alcohol. Similarly, U.S. Pat. No. 6,173,269 discloses a method and apparatus for executing electronic commercial transactions with minors where such transactions are limited only to those vendors that have been approved by the minor's parents. Moreover, M2Card highlights "questionable" transactions on account summaries. Other stored value cards, such as "Visa Buxx," provide convenience features such as the ability to accept and accumulate gifts in the form of value to be spent at particular merchants. For purchases above the amount of the gift, additional value may be deducted from the stored value card. Other examples of currently available stored value cards include MasterCard Electronic Card (India, Malaysia), MasterCard Generation X (Brazil), Visa (Brazil), Novacash (Argentina), and AAA Everyday Funds. Unfortunately, stored value cards often require payment of funds prior to or contemporaneously with addition of value to the cards. Thus, once the funds have been credited to the dependant's account, the cards provide parents with only limited control over the spending capacity and debt accumulation by the dependant.

Other attempts to satisfy the above-described needs without requiring prepayment and storage of value on the cards of the dependants involve the issuance of subsidiary cards that are linked to, and are able to access, the credit lines of the master accounts. For example, U.S. Pat. No. 4,837,422 describes a multi-user card system in which a card combination that is issued to a single cardholder can be re-programmed by the cardholder for use by a sub-user to a desired extent with regard to value and time. Similarly, U.S. Pat. No. 5,864,830 discloses a data processing method of configuring and monitoring a satellite spending card linked to a host credit card such that a predetermined available spending capacity of each satellite card is selectively determined by the holder of the parent card. Moreover, U.S. Pat. No. 5,294,472 describes a credit card spending authorization control system in which allowing a parent to control the use of an ancillary credit or debit card, which is issued to a subsidiary. Further, U.S. Pat.

No. 5,953,710 shows a subsidiary's credit or debit card system that includes a subsidiary's credit card account linked to a parent's credit or debit card account. The systems disclosed in the foregoing patents have typically experienced limited success because parents may not wish to provide their dependents with access to the parents' credit line. Moreover, a sufficient mechanism does not exist that would enable a parent to provide credit to a subsidiary, such as a child, while retaining the ability to control the spending capacity and debt accumulation by the subsidiary.

While it may be advantageous to control and/or monitor the spending capacity of a subsidiary party, it has also been recognized that accepting responsibility for the spending of a subsidiary can entail various disadvantages. For example, where a subsidiary is traveling abroad (e.g., the subsidiary would like to consume spending capacity in a country other than that where the parent resides or other than where the parent card's institution is located), fluctuations in currency exchange rates may cause conventionally defined spending capacities to be inadequate to satisfy the needs of the subsidiary. This may occur, for example, where the spending capacity is defined in terms of U.S. dollars, where the value of a U.S. dollar falls with respect to a Japanese yen, and where the subsidiary resides in Japan. On the other hand, a parent may similarly wish to avoid situations where a subsidiary enjoys a windfall as a result of an advantageous shift in currency exchange rates. To avoid such difficulties, the user may often monitor the exchange rates to compensate for fluctuations. Depending on whether the parent undertakes to perform such monitoring, either the parent or a subsidiary usually assumes the risks associated changes in currency exchange rates.

It also may be desirable to modify the spending capacity associated with a subsidiary card to accommodate changing conditions associated with specific events, economic conditions, or simply the passage of time. For example, it may be desirable to periodically modify spending capacity to accommodate the occurrence of periodic expenses such as tuition or rent, while still restricting a subsidiary from depleting spending capacity before it is needed (e.g., during summer vacation, before tuition becomes due). It may also be desirable to adjust spending capacity or other spending restrictions based on, for example, the age of the subsidiary or the subsidiary's passage of the age of majority or another predefined milestone. Similarly, it may be desirable to adjust spending capacity with the conclusion of a school term and the beginning of summer break or to accommodate a planned trip such as a summer trip to Europe. In the employment context, it may be desirable to adjust spending capacity in situations where, for example, the subsidiary passes an anniversary date or otherwise becomes entitled to a salary adjustment or a bonus, where a corporate administrator has adjusted allowable per diem expenses or wishes to implement a planned adjustment to account for inflation, or the like. It may also be desirable to be able to effect such changes automatically, without requiring intervention each time conditions change.

In recent years, economic globalization has led to an increased number of international business travelers. Yet, as mentioned above, financing international travel in today's environment may give rise to certain difficulties. Business and pleasure travelers often remain in a country of a different origin and/or monetary base than from where the business traveler originated. In some cases, the business traveler may desire to remain in the foreign country for an extended period of time in order to complete his intended business. At any given time, a corporate organization may be managing the funding and other financial arrangements for a large number of employees traveling abroad. The financial needs of those employees may not always be easy to accurately anticipate and/or administer.

The difficult financial needs include, for example, subsisting in a foreign country for any extended period of time typically involves a business traveler paying for living or business expenses as they arise. In that regard, an employer may provide the business traveler with different systems and methods for paying for the expenses. For example, the business traveler may be given cash which can be issued in the currency of the traveler's country of origin (e.g. local currency) or in the currency of the country of the traveler's intended destination (e.g. foreign currency). However, carrying cash has several disadvantages. For example, the cash typically is converted to the currency of the country of intended travel using international currency conversion rates. Further, the traveler typically keeps track of expenses incurred during his business trip for reimbursement and accounting purposes. Further still, cash is often irreplaceable if lost or stolen, leaving the business traveler without sufficient funds to sustain his trip.

In spite of the disadvantages of carrying cash, some business travelers may still prefer to carry a negotiable paper currency such as traveler's checks. In general, paper traveler's checks are issued in the currency of the country in which the traveler's checks are intended to be used. In addition, the traveler's checks typically are given a unique serial number for tracking the checks in the event the checks are lost or stolen. Further, the traveler's checks often are countersigned by the holder before it may be negotiated. Traveler's checks may be desirable as compared to conventional cash because of the signature authorization required and because of the ability to be re-compensated the face value of the traveler's checks if the checks are lost or stolen. The traveler may recoup her losses by reporting to the traveler's check issuing institution the serial numbers of the lost or stolen checks. Unfortunately, since the traveler's check issuing institution must verify that the checks were not used, or were subject to unauthorized use, such reimbursement is typically not immediate. Thus, the traveler is often placed at a financial disadvantage until such time as the verification is completed and the traveler is reimbursed the amount of the lost checks.

Another method for providing the business traveler with needed funds includes issuing the traveler a transaction card enabling the business traveler to electronically interface with a financial institution. For this purpose, a variety of cards exist. For example, a traditional credit card is a card which typically contains a magnetic stripe encoded with an account number which may be read at special terminals' at a merchant's location. The merchant terminal may read the account information and may transmit the account information and the amount of the intended transaction to the credit card issuing institution. The credit card issuing institution may check credit available for the account against the requested transaction to determine if the requested transaction is within the transaction account credit limit (e.g., available credit). Where the requested transaction does not exceed the available credit, the issuing institution may extend the credit needed to complete the desired transaction. Although the credit cards may be readily replaced if lost or stolen, using the credit card to complete a transaction has clear drawbacks. In particular, the user of the credit card is often charged interest on the credit extended, which means that the traveler may end up paying more than the original amount needed to complete the desired transaction.

Another type of transaction card which may be used by a business traveler is a debit card. Typically, a debit card is not used to extend credit, but rather to debit or withdraw cash from an account for immediate payment to a merchant. The debit card typically corresponds to a checking account (or savings account) established by the holder of the debit card. The checking account is usually established at a financial institution located in the country of intended use. The checking account and the financial institution are usually only recognized in the country in which the financial institution is located. Thus, the debit card is typically not useful for completing transactions in countries other than where the checking account is located. This is especially important since the financial institution to which the checking account is linked may not be recognized in the country where the transaction is to be completed.

Still another type of transaction card which may be used by a business traveler to access funds is the automated teller machine (ATM) card. Similar to a debit card, the ATM card is typically linked to a checking (or savings) account maintained at a particular financial institution. As used herein in the context of financial accounts, the terms "maintain" and "maintaining" refer to any act or combination of acts of or relating to establishing, authorizing, enabling, coordinating, funding, debiting, crediting, accessing, tracking, accounting, reporting, modifying, or otherwise facilitating and/or administering one or more such financial accounts and/or transactions involving such accounts. The ATM card may allow the ATM cardholder to remotely access funds stored in the checking or savings account by presenting the card to an ATM which is connected to an ATM interchange to which the financial institution subscribes. Like a debit card, the financial institution should be recognized by the ATM network. Thus, ATM cards may be less useful to a foreign business traveler who attempts to retrieve funds in a country other than where the checking or savings account is established. The financial institution is often not recognized in the country where the transaction is to be completed.

Still another method for providing the business traveler with funds includes providing the business traveler with a "prepaid" transaction card which is linked to a prepaid account. The prepaid account may be established at a financial institution located in the country in which the card is to be used. The prepaid method includes the prepaid cardholder depositing into the prepaid account a predetermined amount of funds. Subsequent to delivery of the goods or services, the amount of the transaction for goods and services is charged against the amount available in the prepaid account. However, similar to the debit cards, the prepaid card is typically geographically limited in that the card may not be used in a country which does not recognize the financial institution where the prepaid account is established. Consequently, since it is often imperative that the business traveler be provided access to sufficient funds for payment of these expenses, a system and method is needed which will allow the business traveler to access the needed funds, whether or not the traveler's attempt to access the funds in his country of origin or the foreign country in which he is traveling.

Accordingly, it would be advantageous to have a system and method for providing a flexible limit subsidiary card that does not require the prepayment and/or storage of value prior to use to facilitate transactions. It would also be advantageous to have a financial vehicle that would enable a parent (e.g., employer) to provide value to be spent by a subsidiary (e.g., employee), while providing control over the spending capacity and/or debt accumulation by the subsidiary, and it would be advantageous if the parent would be able to do so remotely from the subsidiary, and even if the parent's financial institution is located remotely from that of the subsidiary. It would further be advantageous if such control included the ability to limit total spending or to prevent or limit spending for specific classes of goods and/or services or to limit or prevent spending at specific classes of merchants or service providers or to limit or prevent spending at specifically identified merchants or service providers. It would also be advantageous to have a system and method for providing a flexible limit subsidiary card that would provide additional features such as replacement in the event the card is lost or stolen, wherein such a feature is are not typically available with cash. It would also be advantageous to have a system and method for providing a flexible limit subsidiary card that would provide the user with freedom and independence to use the received funds to facilitate on-line and off-line transactions as well as withdrawals of money from ATMs. It would also be advantageous to have a system and method whereby a parent could provide security for emergency situations such as medical care while limiting access to credit in other situations. Finally, it would be advantageous for such a card to enable carry-over of a credit balance.

SUMMARY OF THE INVENTION

The present invention addresses many of the shortcomings of the prior art by providing a flexible limit subsidiary card account that may be issued by a foreign financial institution and that may be used internationally. In particular, the invention is directed toward a system and method that allows a parent to provide funds to a subsidiary and to at least partially control the subsidiary's spending capacity. In a first aspect, a system for administering a subsidiary card account includes a parent and an administrator. The parent, which is associated with an established credit instrument, e.g., a parent account, is configured to communicate a request for a second account to be established and associated with a subsidiary. The administrator is configured to receive the request from the parent and to facilitate the establishment and issuance of a subsidiary account. The administrator is also configured to facilitate determination and adjustment of appropriate spending power for the parent account and spending capacity for the subsidiary account in accordance with a predetermined set of rules. An exemplary set of rules may include an allocation of risk between the administrator and the parent whereby the spending power of the parent account is reduced by an amount that is less than the credit line established for the related subsidiary card account, in accordance with an allocation of risk to the administrator. In addition, an exemplary administrator is further configured to receive and facilitate execution of a request from the parent to define, modify, and/or terminate the spending and/or debt accumulation limits, i.e., capacities, for the subsidiary card account.

In another aspect of the invention, various methods are provided for facilitating the administration of one or more subsidiary accounts. In an exemplary embodiment, a method comprises the steps of receiving a request from a parent to establish a subsidiary account, wherein the parent identifies one or more financial account associated with the parent and established by a first institution (i.e., parent account); establishing a subsidiary account at least partially maintained by a second institution and having a defined spending capacity; and reducing the spending power of the parent account by an amount less than the subsidiary spending capacity. The subsidiary account may be fully maintained by the second institution, which may be situated in a location remote from the first institution, e.g., in a country that is different from the country of the first financial institution. The subsidiary account may be configured for effecting payment to a merchant located within the country of the parent account, remotely from the parent account, or alternatively, in a country other than that of the parent account.

BRIEF DESCRIPTION OF EXEMPLARY DRAWINGS

The above-mentioned objects and features of the present invention can be more clearly understood from the following detailed description considered in conjunction with the following drawings, in which like numerals represent like elements and in which.

DETAILED DESCRIPTION OF EXEMPLARY EMBODIMENTS

Figure 1:
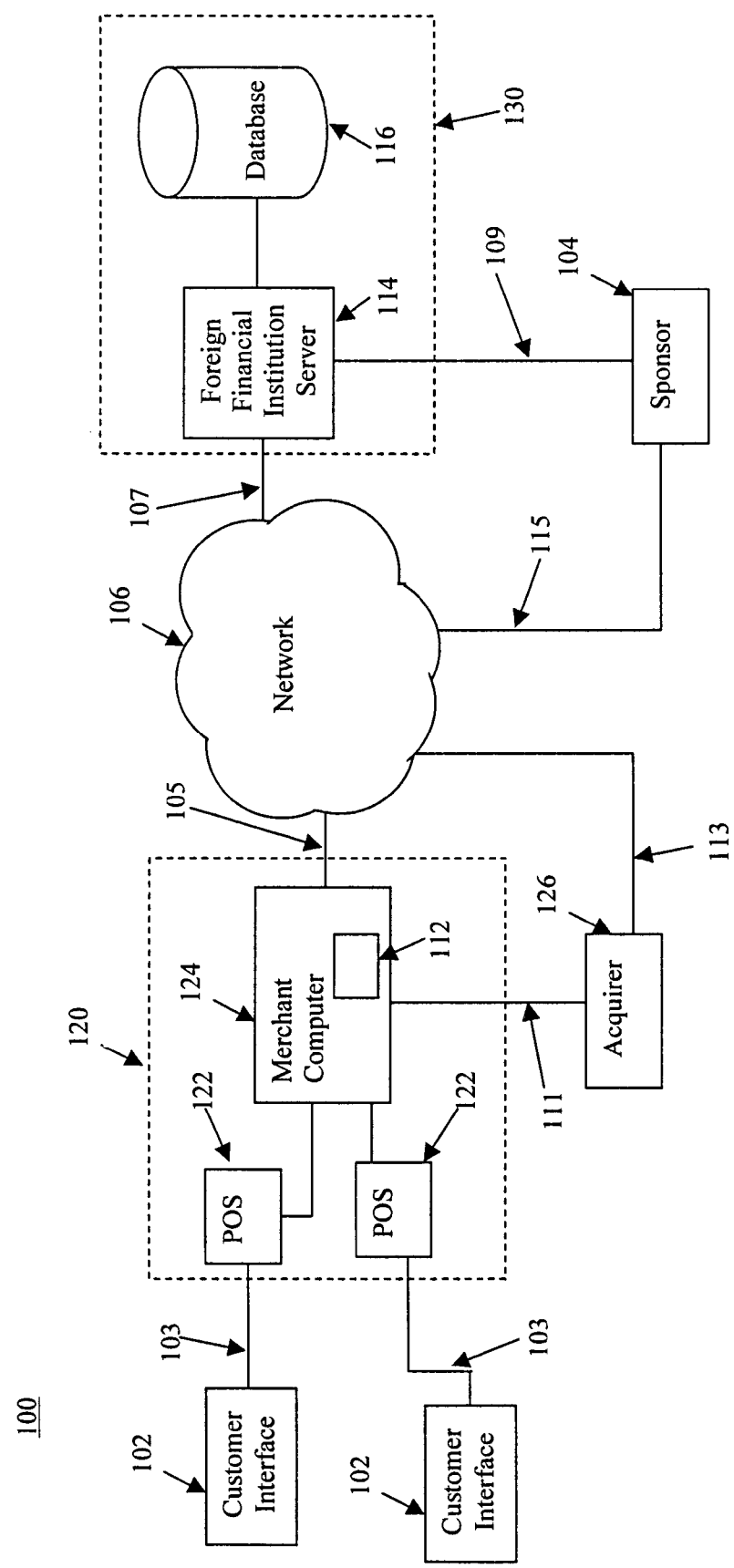
FIG. 1 is a schematic block diagram of a prepaid card issuer system in accordance with an exemplary embodiment of the present invention.

The present invention is a payment and funding vehicle that is configured to allow a parent and an administrator to provide funds in the form of a credit line (i.e., spending capacity) to a subsidiary. The system thereby facilitates control over the subsidiary's spending capacity and/or debt accumulation. In accordance with one aspect of the invention, a system for administering a subsidiary card account includes a parent and an administrator. The parent, which is responsible for a related credit instrument, e.g., a parent account, is configured to communicate a request to the administrator requesting that a credit card account be issued to a subsidiary. The administrator is configured to receive the request from the parent and to facilitate the establishment and administration of the subsidiary card account so that it may be used by the subsidiary to facilitate transactions. The administrator is also configured to facilitate determination and adjustment of appropriate spending power for the parent account and spending capacity for the subsidiary card account in accordance with a predetermined set of rules. An exemplary set of rules may require an allocation of risk between the administrator and the parent whereby the spending power of the parent account is reduced by an amount that is less than the credit line, i.e., spending capacity, established for the related subsidiary card account, in accordance with, and reflecting, an allocation of risk to the administrator. In addition, an exemplary administrator is further configured to receive, and facilitate execution of, a request from the parent to define, modify, and/or terminate the spending capacity and/or debt accumulation limits for the subsidiary card account.

In accordance with a further aspect of the present invention, a method of administering a subsidiary card account at the request of a parent is also provided. In accordance with the invention, a parent communicates a request to an administrator to issue a subsidiary card account to a subsidiary. The administrator receives the request and approves or denies it based on a predetermined set of rules. If the request is approved, the administrator establishes the spending capacity of the subsidiary card account, modifies the spending power of the parent account, and allocates the difference to the administrator as additional risk. The administrator dispatches the subsidiary card, or other tangible indicia of the subsidiary card account, to the subsidiary who may then use the subsidiary card account to facilitate transactions. The administrator additionally facilitates performance of various administrative functions that enable the subsidiary card account to function as a credit vehicle with a degree of control afforded to the parent to define, modify, and/or terminate the spending capacity and/or debt accumulation limits for the subsidiary card account.

As used herein, the term "parent" refers to one or more parties possessing one or more existing credit vehicles, such as credit card accounts, or any other payment or transaction device and desiring to establish, and at least partially accept responsibility for, one or more credit line or other financial commitment system to be used by at least one other party. It should be noted that a parent may be a guardian, company, entity, software, hardware or any other party which provides credit or payment for a subsidiary. Also, as used herein, the term "subsidiary" refers to one or more recipient of a credit or other payment line established at the request of a parent. It should be noted that a subsidiary may be any person, entity, software, hardware or other party capable of receiving and using a credit line provided by a parent and may be a dependant child, an employee, entity, software, hardware or any other party capable of receiving a credit line or any other payment arrangement.

In accordance with the present invention, an account held by a subsidiary (e.g., a subsidiary card account) facilitates transactions by allowing the subsidiary to access credit. It should be noted that the subsidiary card account may be substantially a credit vehicle. As such, it may not require substantial pre-payment, neither by a parent nor a subsidiary. Moreover, a parent or subsidiary card account may include an account code associated with a physical card or simply an account code without a physical card.

It should be noted that, as used herein, the term "administrator" refers to all types of credit issuing institutions, such as banks, credit card companies, card sponsoring companies, or third party issuers under contract with financial institutions. It should also be noted that other participants may be involved in some phases of transactions' related to facilitation of transactions involving the accounts, such as one or more intermediary settlement institution, but these participants are not shown.

An "account number," as used herein, includes any device, code, or other identifier and/or indicia suitably configured to allow a consumer to interact or communicate with the system, such as, for example, an authorization/access code, a personal identification number (PIN), an Internet code, other identification code, and/or the like which may optionally located on a rewards or incentives card, charge card, credit card, debit card, prepaid card, telephone card, smart card, magnetic stripe card, bar code card, and/or the like. Such an account number may be distributed and stored in any form of plastic, electronic, magnetic, and/or optical device capable of transmitting or downloading data from itself to a second device. A subsidiary or parent account number may be, for example, a sixteen-digit credit issuer's identifier such as a credit card number, although each credit provider has its own numbering system, such as the fifteen-digit numbering system used by American Express.

In an exemplary embodiment, a subsidiary card may bear the name of the subsidiary, and an account number corresponding to the account of the parent. In another exemplary embodiment, a subsidiary card may be issued in non-embossed form, with a name and account number, which may be configured to uniquely identify the subsidiary, being printed on the card. In accordance with this embodiment, non-embossed cards may be much more difficult to use for off-line, POS transactions because the old off-line machines create ROCs from the impression left by the embossed letters. The cards may, however, be used for on-line transactions. By encouraging more transactions to be on-line, an issuer may be better able to track transactions in real-time, and therefore prevent a subsidiary card holder from exceeding the limit to which the parent has agreed.

A participating party's credit card numbers may be configured to comply with a standardized format such as a sixteen-digit format using four spaced sets of numbers (e.g., as represented by the number "0000 0000 0000 0000"). In an exemplary embodiment, the first five to seven digits may be reserved for processing purposes and identify the issuing bank, card type and etc. In this example, the last sixteenth digit may be used as a sum check for the sixteen-digit number. The intermediary eight-to-ten digits may be used to uniquely identify the consumer.

Although described in terms of a card account, the invention may represent a complete payment service encompassing all involved processes from authentication of the participants to authorization of the transaction to settlement of the payment. The flexible limit subsidiary card account may be established as virtual account, but can also be offered and distributed as a plastic card to be managed and/or supported by an issuer, and can further be branded for and distributed by a third party. It should be noted that the flexible limit subsidiary card account may be used to facilitate online transactions as well as transactions conducted at storefronts using plastic that has been distributed for the flexible limit subsidiary card account.

In an exemplary embodiment, the present invention provides system and method for a foreign financial institution to issue a subsidiary card for use domestically. As used herein, "domestic" and "foreign" are relative terms. "Domestic" refers to the country of intended or requested transaction, and "foreign" refers to the country where the financial account is located and where the country is different from the domestic country. However, the terms may be used interchangeably in the various embodiments. In particular, a method and system is disclosed which provides for a subsidiary card which may be used domestically, and which is issued by a foreign financial institution. In this context, the foreign financial institution may be one located in a country other than where the subsidiary (i.e., the holder of the subsidiary card) initiates a transaction request. The transaction request may be a purchase request, request for cash back, a request for a balance inquiry, request for transaction or subsidiary card usage history, or any such transaction request permitting the subsidiary to check account activity or to access the funds stored in a subsidiary transaction account.

The subsidiary card account in accordance with an exemplary embodiment of the invention may be opened by a parent, such as the subsidiary's guardian, employer or benefactor, etc. In some instances, the sponsor (i.e., parent) and the card holder (i.e., subsidiary) may be the same entity. The parent may open the account under any business as usual as is standard as determined by the financial institution. The financial institution may request that the parent deposit a fixed monetary amount (e.g., monetary value) into an account uniquely corresponding to the specific subsidiary card account. The amount deposited in the account may be deposited periodically or at any given time. The amount may be deposited in the currency of the country in which the financial institution is located or in any other currency which may be accepted by the financial institution. In addition, the amount deposited in the account may serve as a spending capacity for the subsidiary card. In particular, the subsidiary may be prevented from incurring expenses exceeding the total monetary value stored in the corresponding subsidiary card account. In some instances, the parent may be permitted to make provisions for payment of fees or expenditures incurred where the subsidiary exceeds the amount stored in the subsidiary card account. Such provisions may be specific to the business practices of the financial institution.

Once the subsidiary card account is opened, the financial institution may store in a financial database account identifying information corresponding to the subsidiary card account. The account information may be any information permitting the financial institution to correlate the subsidiary card to the subsidiary card account. For example, the account information may include the name of the subsidiary, the account number corresponding to the subsidiary card account, the monetary value stored in the subsidiary card account, the expiration date of the subsidiary card, the name of the parent, etc. The database containing the account information may be managed by a financial institution server. The financial institution server may be configured to receive transaction requests from a merchant POS device or ATM, authorize the transaction request, and provide payment of funds for the completion of the transaction, etc. Authorization of the transaction request may include locating the file corresponding to the subsidiary card account number provided by the merchant (e.g. matching the subsidiary card account number with the correlative subsidiary account), verifying that the funds are available for completing the transaction, and transmitting the necessary funds for the transaction's completion. In one exemplary embodiment the financial institution may send the necessary funds in batch transmissions. That is, the financial institution may group (e.g., batch) the necessary funds in accordance with a receiving institution (e.g., merchant) identified in the transaction request, or series of transaction requests. The funds may be organized in a batch file. Once batched, the batch file may be periodically provided to the receiving institution. In some instances, authorizing the transaction may include locating the account file corresponding to the subsidiary card and transmitting a card usage history and/or account balance. In this context, the account balance may include a reporting of the monetary value remaining in the account, as well as, the total of expenditures to date.

The subsidiary card may include system and method for storing a readable subsidiary card identifier. The subsidiary card identifier may be any account code readable by a merchant POS device or ATM, where the account code corresponds to the subsidiary card account maintained by the financial institution server. The card identifier information may be stored on the subsidiary card using any technology capable of physically encoding the account information on the subsidiary card. Suitable technologies include magnetic stripe technology, bar coding technology, smart card technology, radio frequency ID, infrared blue tooth or the like. An example of such technology is disclosed in U.S. Pat. No. Re 36,365 issued Nov. 2, 1999 to Levine et al.

The account number assigned to the subsidiary account and encoded on the subsidiary card is preferably recognizable by the merchant POS or ATM systems. Such recognition involves recognizing that the account number has been issued by a financial institution authorized to conduct business on the merchant POS or ATM payment network. The financial institution may be recognized as authorized by use of a code or signature readable by the POS or ATM.

For example, where the subsidiary card issuing institution is located outside the United States, the issuing institution may be issued a code authorizing the issuing institution to transact business over, and be recognizable by, United States based payment networks. These special authorizing codes may be included in the subsidiary card account number. For example, in one exemplary embodiment, the account number may include a bank identification number (BIN) approved by the American Banking Association and a code which may direct the merchant system to the appropriate financial institution for transaction request approval. Since the foreign financial institution is issued a BIN which is recognized domestically, domestic merchant POS and ATM systems may recognize the foreign financial institution as appropriate for conducting transactions over the United States based payment network. That is, unlike conventional cards, such as debit cards and ATM cards, the present invention provides that the foreign subsidiary includes a system for completing a financial transaction domestically, even though the correlative subsidiary account is issued by a financial institution located in a foreign country.

Once the merchant determines that the account number includes a payment network authorizing code, the merchant (or ATM) may process the subsidiary's transaction request. That is, the merchant may seek to determine whether the subsidiary's requested transaction is authorized. The merchant may send the transaction request corresponding to the subsidiary's desired transaction to the foreign financial institution. The transaction request may include an account identifier corresponding to the subsidiary's transaction account at the financial institution. The financial institution may seek to verify whether the account identifier corresponds to an authorized subsidiary account. Verification may include comparing the account identifier with authorized subsidiary account identifications stored in a financial institution database and maintained by a financial institution server. In this context the account identifier may be the account transaction number, a correlative account number, financial institution BIN, personal identification number or the like or any combination thereof. Where the financial institution server successfully matches the account identifier to an authorized subsidiary account, the financial institution may be deemed to have verified that the account identifier may be used to conduct business on the financial institution system. The financial institution server may then seek to determine whether sufficient funds exist in the subsidiary account to complete the desired transaction. That is, the monetary value stored in the subsidiary account on the financial institution database may be compared to the amount of the requested transaction. If the value of the requested transaction is less than or equal to the amount stored in the subsidiary account, the financial institution may authorize the transaction. The financial institution may then send notification to the merchant that the transaction is authorized.

Upon receiving notification that the transaction is authorized, the merchant system may seek to have the transaction satisfied. The merchant system may send a file containing a record of the transaction to the foreign financial institution, whereby funds sufficient to account for the transaction may be electronically transmitted directly to the merchant. Alternatively, the merchant may send the settlement file to an "acquirer." In this context, an acquirer is an entity which receives the settlement file including the account identifying indicia (i.e., account number) and summary of changes, and forwards the settlement file to the foreign financial institution for satisfaction. The acquirer may individually send the settlement file to the foreign institution, or may organize (e.g., batch) all settlement files corresponding to a particular account or foreign financial institution prior to sending the batch files to a foreign institution for satisfaction of the transactions. Where the acquire batches the settlement files, the batched settlement files may be sent to the foreign financial institution as one batch file containing several transactional requests. The foreign financial institution may receive the batch requests and satisfy each individual settlement file or transaction request accordingly. In another exemplary embodiment where multiple settlement files correspond to one merchant the foreign financial institution may batch the funds necessary to satisfy the settlement files and forward the merchant batch to the merchant. Alternatively the financial institution may send the batch files to the acquirer, which may in turn forward the batch files to the appropriate merchant.

In some instances, the subsidiary card may not be authorized because the subsidiary account identifier may not be matched to any file stored on the financial institution database. Where no match is made between the account identifier provided by the subsidiary and the subsidiary account identifiers stored on the financial institution database, the subsidiary account number provided to the financial institution will be deemed unauthorized and/or invalid. The financial institution server may then return a message to the merchant point of sale device or ATM notifying merchant, the subsidiary, or the ATM that the requested transaction has been denied processing.

As noted, once the account number is verified by the financial institution, the financial institution server may seek to determine whether the subsidiary's requested transaction may be completed. In one instance the financial institution server may compare the monetary amount of the requested transaction with the monetary amount stored in the subsidiary card account located on the financial institution database. If the requested transaction amount exceeds the amount stored in the subsidiary card account, the subsidiary's requested transaction may be denied.

In addition, a denial message may also be sent where the subsidiary attempts to use a subsidiary card which is expired. That is, a sponsor or financial institution may predetermine the length of time during which the subsidiary card may be used. The length of time may be noted by an expiration date, after which the subsidiary card may not be used. Where the expiration date approaches, the financial institution may contact the sponsor and notify the sponsor that the subsidiary card will expire. The financial institution may contact the sponsor via any communication network for sending and receiving electronic communications. Alternatively, the financial institution may contact the sponsor via traditional mail methods.

However, it should be noted that the subsidiary card account is re-loadable or restorable. That is, where the value stored in account is depleted or nearly depleted, the financial institution may permit the sponsor to restore the value to any suitable monetary level. The financial institution may notify the sponsor that the value stored in the account is depleted using any suitable communication network for sending and receiving electronic communications, as described above. Alternatively, the financial institution may notify the sponsor that the account is depleted using translation postal network (e.g., notification letter).

In some instances, the financial institution may request additional verification of the subsidiary's identity. For example, where the merchant POS device or ATM requires the subsidiary to enter a unique security code corresponding to the unique subsidiary card account stored on the financial institution database, the financial institution may seek to authenticate the provided security code (e.g. personal identification number (PIN), biometric fingerprinting, electronic signature, or the like). The financial institution may receive the security code and the compare the security code to security codes stored on the financial institution database and which correlates to the subsidiary card account number. If a match is made, the requested transaction may be permitted to proceed. Contrarily, if a match is not made, the transaction request may be denied and the subsidiary transaction terminated.

The operation of the invention may be understood more fully with reference to FIG. 1. FIG. 1 illustrates an exemplary system 100 in accordance with an exemplary embodiment of the present invention. System 100 includes an online infrastructure that may be used to authorize a transaction request received from a merchant. With reference to FIG. 1 exemplary card provider system 100 may include a number of customer interface systems 102, a merchant system 120, and foreign financial institution system 130, which may be configured to intercommunicate via a network 106. The system 100 may additionally include an acquire 126 configured to receive settlement requests from merchant system 120 and provide the settlement requests to the foreign financial institution system 130 via network 106. System 100 may further include a parent system 104, which may be configured to communicate with foreign financial institution system 130 to open a subsidiary account, replenish subsidiary account funds, or receive account activity reports from foreign financial system 130.

Customer interface 102 may include any conventional combination of hardware and software components configured to allow a subsidiary to communicate over network 106. For example, customer interface 102 might include a standard personal computer (PC) comprising a CPU, monitor, storage, keyboard, mouse, and communication hardware appropriate for the given data link 103 (e.g., V.90 modem, network card, cable modem, etc.). In alternate embodiments, customer interface system 102 may be a personal data assistant (PDA) capable of manipulating images and communicating with merchant system 120. Customer interface system 102 typically may typically include an operating system (e.g., Windows 95/98/2000, Linux, Solaris, MacOS, and/or the like) as well as various conventional support software modules and drivers typically associated with computers. Customer interface system 102 may also include application software configured to communicate via merchant system 120 over network 106 with financial institution system 130. For example, one such application software may include a world wide web (WWW) browser or any other communication software. In an exemplary embodiment, customer interface system 102 includes a conventional Internet browser application that operates in accordance with HTML and HTTP protocols such as Netscape Navigator (available from the Netscape Corporation of Mountain View, Calif.) or Microsoft Internet Explorer (available from the Microsoft Corporation of Redmond, Wash.).

Merchant system 120 may include a network of point of sale devices 122, configured to communicate with customer interface 102 for receiving the subsidiary card account identifying information. As noted, the present invention is described with respect to a point of sale device to simplify the understanding of the operation of the invention. In this context, the point of sale device 122 may be any device suitable for receiving the subsidiary card account number and transmitting the card account number to a merchant computer 124 for processing.

Merchant system 110 may further include a merchant server 112 configured to communicate with financial institution system 130 via a network 106. The merchant server 112 and the financial institution server 114 may be configured to send and/or receive information (e.g., subsidiary identity, subsidiary account number, expiration date, transaction purchase history, etc.) related to a transaction request (e.g. log on request, request for access, purchase request, request for pre-approval application, etc.). In an exemplary embodiment, the transaction request information provided by the merchant may include a code identifying the nature of the transaction. The code may include information identifying the transaction as a purchase request, inquiry (e.g., balance, transaction history) and/or the like.

The merchant server 112 may be configured to receive the transaction request and/or transaction initiating indicia from the customer interface 102 and seek validation of the information provided from the issuing financial institution 130. In particular, the merchant server 112 may send a validation or authorization request to the issuing financial institution server 114. The financial institution server 114 may validate the information by matching the information contained in the transaction request to data files stored on a financial institution database 116. Once the information is validated, a corresponding transaction authorized signal may be forwarded to the merchant server 112, for use in determining whether to complete the transaction requested by customer interface 102.

Merchant server 112 and financial institution server 114 may be any conventional servers (e.g. transaction account server) known in the art, including system and method for receiving transaction requests (e.g., balance, transaction history, or purchases request, etc.) via the network 106, processing such transaction requests and sending validation (e.g., sending confirmation or denial) of the transaction requests to customer interface 102. Customer interface 102 may be suitably coupled to the merchant system 120 via data lines 103. Merchant system 120 may be suitably coupled to the foreign institution system 130, via network 106 via data links 105 and 107. In addition, where the system 100 further includes a parent system 104 configured to transmit a request to open a subsidiary card account and to receive an accounting (e.g. account activity, depletion of funds, account expiration), such parent system 104 may be connected to foreign financial institution system 130 via data link 109 or via network 106 and data links 115 and 107.

Merchant server 112 and issuing institution server 114 may comprise any number of hardware, software, and networking components suitable to provide an user interface to a network 106. In addition, servers 112 and 114 may be configured to manage databases, such as for example database 116. In one embodiment, server 112 and server 114 may include Sun Ultra SPARC Enterprise 250 and 450 servers which may be used in conjunction with a Sun Solaris 7 or Linux operating system, Apache web server software, and an Oracle 8 or MySQL database system. Of course, particular hardware and software components used in servers 112 and 114 will vary widely from embodiment to embodiment. Furthermore, servers 112 and 114 may represent a "cluster" or group of separate computer systems providing the functionalities described herein.

A variety of conventional communications media and protocols may be used for data links 103, 105, 107, 109, 111, 113 and 115. Such links might include, for example, a connection to an Internet Service Provider (ISP) over a local loop as is typically used in connection with standard modem communication, cable modem, Dish networks, ISDN, Digital Subscriber Line (DSL), or various wireless communication methods. In addition, customer interface system 102 and merchant system 120, might each independently and separately, or collectively, reside within a local area network (LAN) which interfaces to network 106 via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

In an exemplary system 100, foreign financial institution database 116 may include a plurality of distinct locations for maintaining individual subsidiary, subsidiary account, account security, or parent information. Such information may include subsidiary information, such as subsidiary identity, account number, account balance, amount available, subsidiary PIN, purchase history, etc. (collectively "customer profile"). For example, in one embodiment, a distinct location may include the customer profile of a single subsidiary. The database 116 may be a graphical, hierarchical, relational object-oriented or other database, and may be maintained on a local drive of server 114 or on a separate computer coupled to server 114 via a local area or other network (not shown). In one embodiment, the database may be a collection of ASCII or other text files stored on a local drive of server 114. Subsidiary account information may be suitably retrieved from the database 116 and provided to customer interface 102 or to merchant system 120, upon request via a server application, as described more fully below.

As noted, within database 116 there may be stored a plurality of individual distinct data locations corresponding to the customer profile for each subsidiary. In one embodiment, database 116 may be managed by the financial institution server 114 which may be maintained on a subsidiary card issuer (e.g., foreign financial institution) system 130 with which the subsidiary has an established subsidiary account. The subsidiary account may be associated with any suitable service such as a banking service capable of use for commercial transaction purposes. For example, the subsidiary account may be associated with checking, savings, interest bearing accounts or the like. Further, the subsidiary account may additionally allow the merchant system 120 to recover payment for transactions made by an individual subsidiary.

Figure 2:
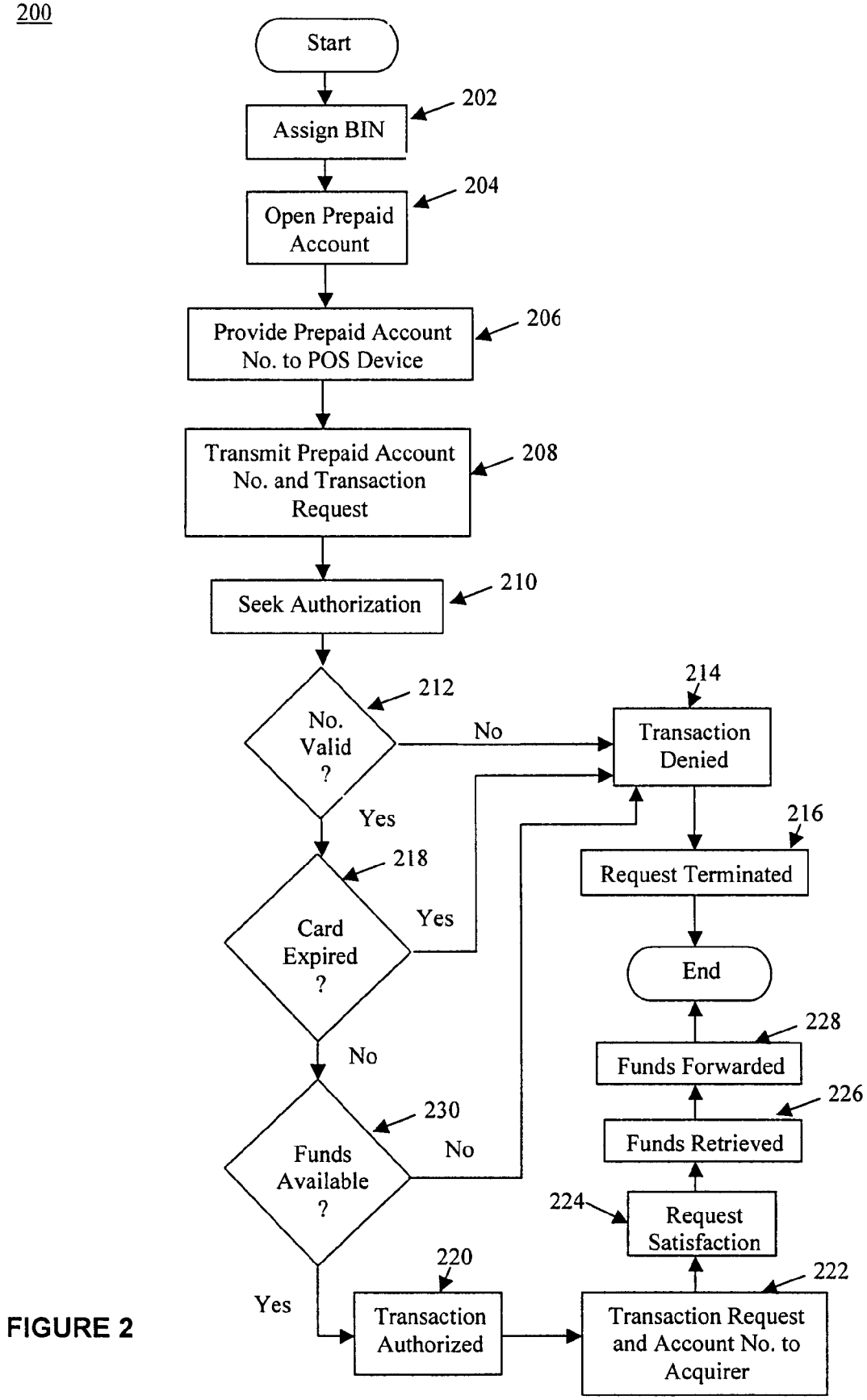
FIG. 2 is a flowchart illustrating a system and method for ensuring completion of a transaction request using a prepaid card issued by a foreign financial institution in accordance with an exemplary embodiment of the present invention.

The operation of the present invention may be more fully understood with reference to FIG. 2 and continued reference to FIG. 1. FIG. 2 depicts a flowchart of an exemplary subsidiary card system 200 in accordance with the present invention. As shown, system 200 may begin with the foreign financial institution system 130 being assigned a domestic payment network authorization code (i.e., a BIN). To aid in increased understanding of the invention, the flowchart in FIG. 2 and the system in FIG. 1 is described with respect to a foreign financial institution located outside the United States and with respect to domestic transactions taking place in the United States. Thus, foreign financial institution system 130 is described as being assigned a BIN approved by the American Banking Association (step 202) or any similar authorizing protocol operating in the United States. The BIN is such that it may be recognized and accepted by any network configured to accept BINs domestically, and for which network the financial institution may be registered. In this context, the BIN may be used to identify the foreign financial institution system 130, even though the financial institution may be located abroad (e.g., not domestically).

In one exemplary embodiment, the foreign financial institution system 130 is such that it may be configured to establish a subsidiary account for use in satisfying financial transaction requests. The establishment of the subsidiary account may be accomplished by any means as determined by the foreign financial institution. As noted, the foreign financial institution system 130 may include an establishment program for facilitating the subsidiary account establishment. In some instances, it may be necessary for the financial institution to institute an establishment program prior to beginning the subsidiary account process. In some cases, however, the financial institution system 130 may have an establishment program already in place.

The foreign financial system 130 may include a database 116, wherein distinct database locations may be reserved for storing the subsidiary account information (e.g., account number, monies available, transaction history, expiration date, parent identifier, etc.) and/or customer profile (e.g., subsidiary account holder name, address, PIN, etc.). The distinct database locations may correspond to distinct subsidiary accounts such that the subsidiary account information is correlated to the customer profile.

The foreign financial system 130 may further include a foreign financial institution server 114 configured to manage database 116. The server 114 may be such that it may enable the financial system 130 to receive transaction authorization requests, and validate such request, as is described more fully below.

Once the financial institution system 130 has been provided a BIN (step 202) and suitably establishes a system and method for providing a subsidiary account, a parent 104 may open a subsidiary account with the financial institution system 130 (step 204). The parent 104 may open the subsidiary account using any means as determined by the financial institution system 130. In one embodiment, the parent 104 may open a subsidiary account by submitting an application for a subsidiary account including the subsidiary account subsidiary name and account expiration date, and providing funds to the subsidiary account for establishing the spending capacity associated with the account. The funds may be provided in the currency of the country in which the foreign financial institution system 130 is located or any currency acceptable to the system 130. The funds may be provided electronically over data link 109, via check, money order or in any manner as determined by the foreign financial institution system 130.

Upon opening the account, the sponsor 104 may provide a subsidiary card to a subsidiary using the card in a country different from the subsidiary's country of origination. The subsidiary may travel to the foreign country and attempt to complete a financial transaction, such as, financial transaction for goods or services. To complete the transaction, the subsidiary may present the subsidiary card account information to a merchant point of sale (POS) device 122 via a customer interface 102 (step 206). The subsidiary account information may be presented in the form of an imprinted or embossed card wherein the subsidiary account number is encoded on the card in a magnetic strip, barcode or the like. The subsidiary may present the subsidiary account information to the POS device 112 along with a transaction request. The POS device 122 may further transmit the subsidiary card account information and transaction request to a merchant computer system 124 including a merchant server 112 (step 208).

In one embodiment, the account information may include a unique routing code which may be used to direct the merchant server 112 to the appropriate financial institution system 130. In one example, the unique routing code may be a BIN or may be coupled with a BIN. Merchant server 112 may be configured to receive the account information and the transaction request, and provide the account information and transaction request to a foreign financial institution system 130 for authorization (step 210). The merchant server 112 may identify the appropriate financial institution system 130 for receipt of the account and transaction request information by the assigned BIN and institution's unique routing code.

Authorization of the transaction may take place in several steps. For example, the foreign financial institution system 130 may include a server 114 configured to received the account information and match the account information to its corresponding data location on foreign financial institution system database 116 (step 212). In an exemplary matching method, the account information may be compared to the distinct account locations on database 116 to determine if the subsidiary account information may be found in the database 116. A match is made if corresponding account information is found on the financial institution database 116. If a match is made, the foreign financial system server 130 may indicate that the account number is valid. However, the foreign financial system server 130, or alternatively, the merchant system 120, may require additional verification of the subsidiary card authenticity. For example, the subsidiary may be required to provide a PIN number, biometric fingerprint, electronic signature, or the like, as a form of identity verification. The identity verification may be received by the financial institution system 130, via network 106, merchant system 120 and customer interface 102. The foreign financial institution server 114 may seek to match the provided identity verification to the identity verification information stored in the correlative customer profile area on database 116. Where a match is made, the transaction authorization process may continue. Where the account information and/or associated identity verification information are not found on database 116, the financial institution server 114 may provide the merchant system 120 with a transaction denied message (step 214) and the transaction request may be terminated (step 216).

Even where the account information and associated PIN are matched on the database 116, the system 130 may further determine whether the transaction is authorized for completion. In particular, the foreign financial system 130 may determine whether the subsidiary account has sufficient funds for completing the transaction (step 230), or whether subsidiary account card is expired (step 218). That is, the system 130 may seek to determine if the funds are available in the subsidiary account to complete the transaction, or if date of the transaction request falls after the date on which the subsidiary account is to expire. As noted, the expiration date may be a date determined by the sponsor 104 or by the foreign financial institution system 130. Where the transaction date falls after the expiration date of the subsidiary account, the transaction request may be denied (step 214) and the transaction request may be terminated (step 216). Similarly, where the monetary amount of the requested transaction exceeds the funds available in the subsidiary account, the transaction request may be denied (step 214) and the transaction request may be terminated (step 216). It should be noted, that in verifying whether sufficient funds exist, financial institution server 114 may first convert the monetary amount noted in the transaction request to the correlative amount in the domestic currency. The conversion may be made using available international currency conversion rates.

In the event that the financial institution server 114 matches the subsidiary account information to correlative matching account information on database 116, verifies that the subsidiary account is not expired, and that the transaction request does not exceed the stored monetary value, the transaction may be authorized (step 220). Upon authorization, the financial system server 114 may provide the merchant system 120 with a transaction authorized message via any suitable communications network, permitting the transaction request for goods or services to proceed. The merchant system 120 may then seek to have the transaction request satisfied. In this context, the transaction request may be satisfied where the merchant system provides a request for payment of goods and services which is responded to by the financial institution system 130 with a transfer of funds for payment of the goods and services provided.

In seeking settlement of the transaction request, the merchant system 120 may directly request payment from the financial institution system 130, or the merchant system may provide a settlement request to an acquirer 126 (step 222). The acquirer 126 may be any entity configured to receive settlement request from a merchant system 120 and provide the settlement request to the foreign financial institution 130 (step 224). In one embodiment, the acquirer 126 may send the settlement request individually to the financial institution system 130. In another embodiment, the acquirer 126 may provide a multitude of settlement requests to the financial institution system 130, where the settlement requests are organized in a batch. The settlement request may be organized in accordance with any indicia to identifying the foreign financial institution for receiving the batch. For example, the batch may be organized by the BIN of the financial institution system 130, by the subsidiary card account number, by the transaction date, or the like.

Upon receiving the settlement requests, the financial institution system server 114 may process the request for payment to merchant system 120. The financial institution system server 114 may match the transaction requests to the appropriate distinct data location on database 116 corresponding to a particular subsidiary account. Funds necessary for satisfaction of the transaction request may be retrieved from the subsidiary account by server 114 (step 226) and provided to the merchant system 120 (step 228). While the funds stored in the financial account may be provided in the currency of the country in which the financial system 130 is located, the funds transferred to the merchant system 120 may be converted to the currency of the country in which the merchant system 120 is located. The funds may be converted by foreign financial institution system 130 or by an acquirer 126 prior to forwarding the funds to merchant system 120. For example, in one exemplary embodiment the foreign financial institution 130 may provide the funds to an acquirer 126 via a network 106. The acquirer 126 may receive the funds in the currency of the country wherein the foreign financial institution system 130 is located and may convert the funds into the currency of the country wherein merchant system 120 is located. That is, the funds may be permitted to undergo a currency conversion, wherein the funds are converted to the a second currency based on the existing currency exchange rate. If incorrect currency exchange rates are used, thereby creating a deficit to the merchant, the deficit may be charged against (e.g., deducted from) the subsidiary account. If the deficit charged against the subsidiary account creates an insufficient funds situation, the loss may be born by the financial institution system 130. Similarly, where the incorrect exchange rate creates a surplus (e.g., by causing the system 130 to forward more money than required, the surplus may be returned to the system 130 and added to the subsidiary account balance. In one exemplary embodiment, the funds may be provided electronically. An exemplary method for providing funds electronically is disclosed in U.S. Pat. No. 6,304,860 issued Oct. 16, 2001 to Martin, Jr. et al., which is incorporated herein by reference.

In some cases, the funds stored in the subsidiary account may become depleted due to the submitted settlement request. In this instance, the foreign financial institution may notify the parent system 104 and the subsidiary of the subsidiary account's depleted status. Such notification may be provided to the sponsor system 104 and subsidiary electronically, in accordance with established methods for sending electronic communications. Alternatively, the notice may be provided to the sponsor system 104 and the subsidiary via traditional postal methods (e.g., notification letter). Upon notification of the account's depleted status, the sponsor may be permitted to provide additional funds to the subsidiary account (e.g., reload the account) for future usage by the subsidiary account subsidiary.

As noted, the subsidiary card account includes a expiration date determined by the parent 104 or the foreign financial institution, after which the subsidiary account may not be valid for completing transaction requests. Foreign financial institution system 130 may be configured to provide notice of an impending expiration date to the sponsor 104 and/or the subsidiary. The expiration date notice may be provided electronically, or via traditional postal methods. Upon receipt of the expiration notice, the sponsor 104 may be permitted to determine if new expiration date should be associated with the account. Where a new expiration date is chosen, the subsidiary account may be authorized for usage until the termination of the new expiration date. Contrarily, where the sponsor 104 elects not to establish a new expiration date, the funds remaining in the subsidiary account may be returned to the sponsor 104. The funds may be returned electronically, or via traditional postal methods, and may be returned in the currency of the country in which the financial institution system 130, the sponsor 104 or the subsidiary is located. It should be noted that the parent 104 may wish to close the account prior to the expiration date. In such a case, the sponsor 104 notifies the server 114 of its intent to close. Upon closing the subsidiary account, the server 114 may forward any remaining funds to the sponsor 104. Alternatively, the funds may be returned to the subsidiary. The decision on who receives the funds upon closing the subsidiary account may be made by the sponsor 104 or the foreign financial institution system 130 when opening the subsidiary account.

The transaction request provided by merchant server 112 to financial institution 130 may include a request for a reporting of subsidiary account activity (e.g., balance, record of transaction request, record of transaction request satisfied, etc.). In this instance, financial institution server 114 may be provided the transaction request directly, or via an acquirer (step 224). To honor the transaction reporting request, the financial server 114 may seek to match the subsidiary account number to one of the distinct database locations storing subsidiary account information. In particular, the server 114 may determine whether the account number may be matched on the database 116, retrieve the corresponding matching information stored on the database 116 and provide the requested information to the customer interface 102 via the network 106 and merchant system 120.

In the foregoing specification, the invention has been described with reference to specific embodiments. However, it will be appreciated that various modifications and changes can be made without departing from the scope of the present invention as set forth in the claims below. For example, various processing steps may be combined or eliminated as required, such as for example, permitting the foreign financial institution server 114 to establish a subsidiary account prior to receiving a BIN, or providing a transaction settlement request directly to the foreign financial institution 114, without the use of an acquirer 126. Further, various system elements described herein may be eliminated, and various steps may be performed by one or more of the elements described herein, such as for example, permitting the subsidiary to communicate directly with a merchant system 120 independently of a POS device 122. In addition, other suitable elements may be substituted for the elements described herein, or inserted between the connecting lines of the embodiments set forth, without departing from the scope of this invention. Further still, the specification and figures are to be regarded in an illustrative manner, rather than a restrictive one. As such, any modifications resulting in a system which is suitable for practicing the invention, are intended to be included within the scope of the invention. Accordingly, the scope of the invention should be determined by the appended claims and their legal equivalents, rather than by the examples given above. For example, the steps recited in any of the method or process claims may be executed in any order and are not limited to the order presented in the claims (e.g., validating available funds prior to verifying the subsidiary card expiration date, etc.).

Figure 3:
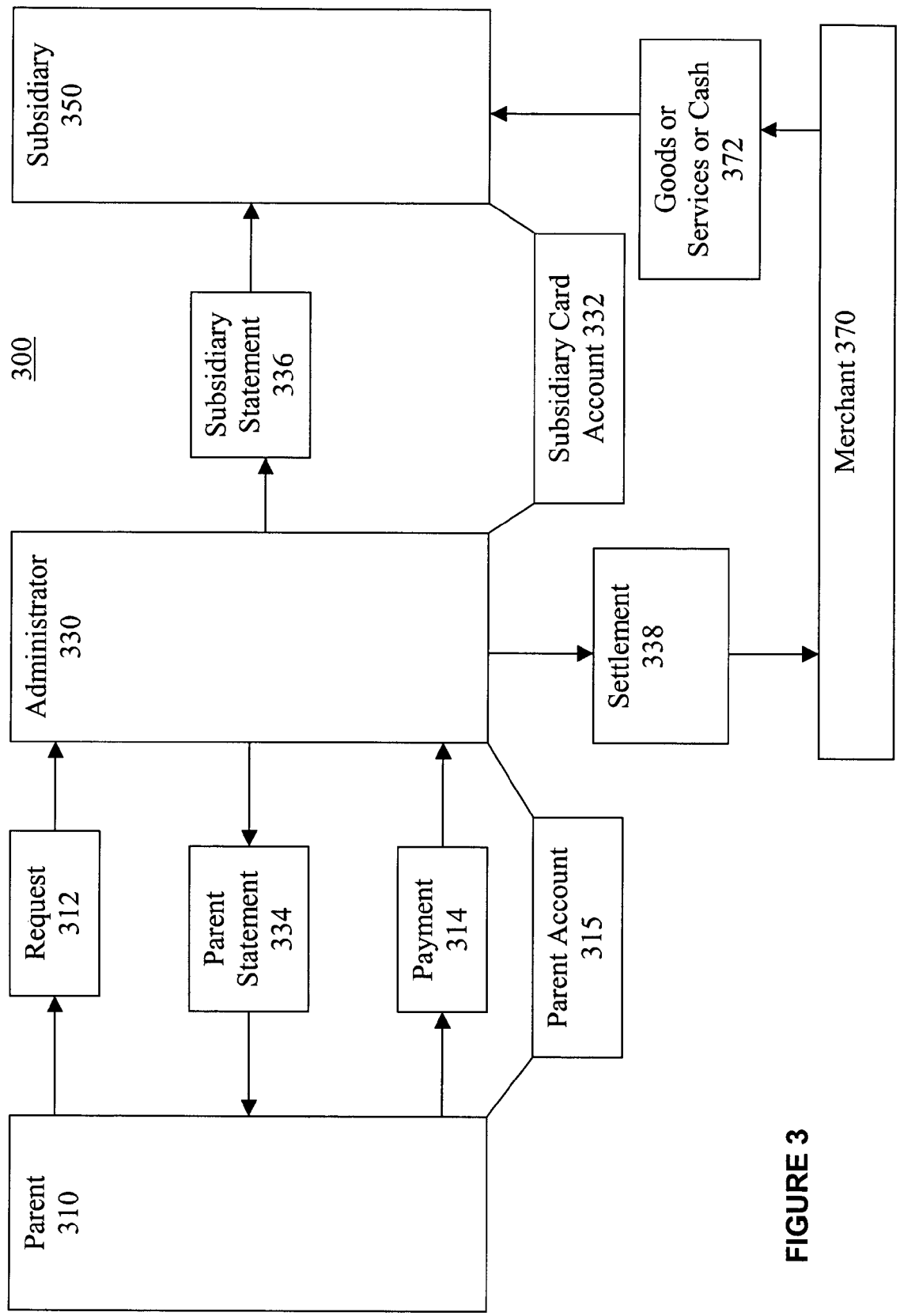
FIG. 3 illustrates the interactions of an exemplary system configured to administer a flexible limit subsidiary card account.

FIG. 3 illustrates the interactions of an exemplary system configured to administer a flexible limit subsidiary card account. In accordance with an exemplary embodiment, the system 300 facilitates interaction between a parent 310, a subsidiary 350 and a merchant 370 through an administrator 330. Parent 310 is responsible for a parent account 315, and is configured to communicate a request 312 to administrator 330 requesting that a subsidiary card account 332 be established for subsidiary 350. Administrator 330 is configured to receive request 312 from parent 310 and to facilitate the establishment and administration of a subsidiary card account 332 so that it may be used by subsidiary 350 to facilitate transactions.

In an exemplary embodiment, the system of the present invention enables parent 310 to provide one or more subsidiary account 332, each being related to the parent account 315. In other words, subsidiary card account 332 may comprise one or more accounts that may each be linked to the parent account 315. It should also be noted that parent account 315 may represent one or more accounts sharing responsibility for subsidiary card account 332. Similarly, subsidiary 350 may comprise a corresponding number of subsidiaries, each being the beneficiary of one or more subsidiary card account 332. Accordingly, the system of the present invention may enable a corporation to provide for many employees and similarly may enable a guardian to provide for many dependents.

In an exemplary embodiment, the flexible limit subsidiary card account system 300 is implemented as computer software modules loaded onto the computer of parent 310, the computer of administrator 330, the computer of subsidiary 350, and/or the computer of a merchant 370. In an exemplary embodiment, the computer of parent 310, the computer of subsidiary 350, and the computer of merchant 370 do not require any additional software (beyond what is required to accomplish traditional on-line transactions) to participate in the online transactions supported by the flexible limit subsidiary card account system 300. The additional facilitating software is implemented on the computer of administrator 330.

The system 300 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including data regarding the parent account 315, subsidiary 350 data, merchant 370 data, financial institution data and/or like data that could be used in association with the present invention. As those skilled in the art will appreciate, the computer of parent 310 and subsidiary computer will typically include an operating system (e.g., Windows NT, 95/98/2000, Linux, Solaris, etc.) as well as various conventional support software and drivers typically associated with computers. The invention, however, could also be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention may be implemented with TCP/IP communications protocols, it will be readily understood that the invention could also be implemented using IPX, Appletalk, IP-6, NetBIOS, OSI or any number of existing or future protocols. The system contemplates the use, sale or distribution of any goods, services or information over any network having similar functionality described herein. Computers can be in a home or business environment with access to a network. In an exemplary embodiment, access is through the Internet through a commercially-available web-browser software package.

Database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Communication between the parties and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

To simplify the description of the invention herein, various embodiments of the invention is may be described as pertaining to a system facilitating communication between a domestic merchant system (or ATM) and a foreign financial institution card issuer using a computer network. It should be appreciated that the computing units may be connected with each other via a data communication network. The network may be a public network and assumed to be insecure and open to eavesdroppers. For example, the network may be embodied as the internet. In this context, the computers may or may not be connected to the internet at all times. For instance, the computer of the parent 310 and/or the computer of subsidiary 350 may employ a modem to occasionally connect to the internet, whereas administrator 330 or bank computing center might maintain a permanent connection to the internet. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997). Loshin, TCP/IP Clearly Explained (1997). All of these texts are hereby incorporated by reference.

As a further example, the computer of parent 310, the computer of subsidiary 350, the computer of administrator 330, and the computer of merchant 370 may all be interconnected via a network, referred to as a transaction network. The transaction network represents existing proprietary networks that presently accommodate on-line transactions for credit cards, debit cards, and other types of financial/banking cards. The payment network is a closed network that is assumed to be secure from eavesdroppers. Examples of the payment network include the American Express®, VisaNet® and the Veriphone® network.

One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant 370 system might also reside within a local area network (LAN) which interfaces to network via a leased line (T1, D3, etc.). Such communication methods are well known in the art, and are covered in a variety of standard texts. See, e.g., Gilbert Held, Understanding Data Communications (1996), hereby incorporated by reference.

In on-line implementations of the instant invention, each participant is equipped with a computing system. Parent 310 may be equipped with a computing unit in the form of a personal computer, although other types of computing units may be used including laptops, notebooks, hand held computers, set-top boxes, and the like. Administrator 330 may be equipped with a computing unit such as a computer-server, although other implementations are possible. Subsidiary 350 and merchant 370 each may be implemented as a computer, which may be a main frame computer or which may be implemented in other forms, such as mini-computers, PC servers, a network set of computers, and the like.

The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

In an exemplary embodiment, the system of the present invention facilitates administration of a subsidiary card account 332 so that it may function with many of the features and characteristics of traditional credit cards. For example, subsidiary card account 332 may be configured to be used at an ATM or at a point of sale and can also be configured to provide security and protection through traditional insurance features. Moreover, subsidiary card account 332 may be configured to satisfy most if not all standard credit card requirements such as embossing of the identifying information (e.g., name, account number, expiration date, signature, and the like) of parent 310 and subsidiary 350.

In addition, the flexible limit subsidiary card account system can accommodate the requirements of the underlying dependent financial instruments. If there are usage restrictions or limitations in place for the parent account 315, those same controls (if known) may be enforced by flexible limit subsidiary card account 332. For example, if subsidiary card account 332 is to be restricted to use at only restricted merchants 370, then the system will disable subsidiary card account 332 from being used at any non-approved merchant 370.

Similarly, a subsidiary card account may be configured to accommodate emergency conditions such as an emergency needs for medical care, pharmaceuticals, transportation, or the like. Accordingly, subsidiary card account may be configured to bear an extended spending capacity available for use at specific merchants (e.g., a specified hospital, pharmacy, or travel agent) or specified classes of merchants (e.g., medical service providers, pharmacies, or travel agencies in general). Optionally, a subsidiary card may be configured to accommodate anticipated expenditures that may occur only periodically, such as tuition or rent payments. In accordance with this embodiment, spending capacity may be reserved to accommodate payment for the anticipated expenditures even if spending capacity for other expenditures (e.g., entertainment) may have been exhausted.

The limitations or restrictions may be communicated to a host via any network, email, webpage, voice response unit or customer service line via customer service representatives. The limitations or restrictions may also be transmitted, directly or indirectly, to the host via one or more of a telephone, a touch-tone telephone, a two-way pager, a reply pager, a home computer, a personal computer, a personal communication device, a personal communication services device, a digital communications device, a television, an interactive television, a digital television, a personal digital assistant, a display telephone, a video telephone, a watch, a cellular telephone, a wireless telephone, a mobile telephone, a display cellular telephone, and a facsimile machine.

The limits or restrictions may include, for example, charge amount per charge, charge amount per day, charge amount during any time period, charge amount at a particular merchant, charge amount at a particular chain of merchants, charge amount at a type of industry, increasing or decreasing charge amount limits over time, limit on number of transactions during any time period and/or any combination thereof. The limitations may also include, for example, any one or more of type of authorized transaction, one of a good and a service authorized, authorized one of vendor, store, and service provider, transaction amount limitation, daily spending limit, authorized geographical area of usage, authorized time of usage, authorized individual, transaction limit for one of a savings account, a checking account, a bank account, and an automated teller machine account, authorized individual for transacting on a savings account, a checking account, a bank account, and an automated teller machine account, proof of identity required for transaction, one of bank and financial institution authorized for the transaction, a limitation of a fee charge on an account, automated teller machine account access code, authorized transaction location, authorized telephone number, authorized telephone calling time, authorized telephone calling area, authorized telephone calling destination, authorized number of telephone calls, authorized incoming telephone call, authorized telephone call duration, and authorized telephone call one of cost and transaction amount.

With further reference to FIG. 3, administrator 330 is configured to facilitate determination and adjustment of appropriate spending powers for the parent account 315 and subsidiary card account 332 in accordance with a predetermined set of rules. An exemplary set of rules configured to accommodate the provision of a credit line to a subsidiary 350 may require an allocation of risk between administrator 330 and parent 310 whereby the spending power of the parent account 315 is reduced by an amount that is less than the spending capacity or credit line established for related subsidiary card account 332, in accordance with, and reflecting, an allocation of risk accepted by administrator 330. Similarly, the system 300 may include a similar set of rules and be configured to accommodate a reduction in an existing spending capacity that previously had been provided to a subsidiary 350. For example, the spending power of the parent account 315 may be increased by an amount that is less than the reduction in the spending capacity for the related subsidiary card account 332.

It should also be noted, however, that specific embodiments of the invention may be configured to accommodate local customs and/or practices or to accord with applicable legal requirements. The details of how the spending capacity of the parent card is consumed as the spending capacity of each subsidiary card is increased and/or consumed will depend, of course, on regulatory and practical considerations applicable wherever and however the cards are used and their functions facilitated. In addition, the administrator may be configured to allocate payment liability to lie entirely with the holder of the parent card so as to eliminates the risk of uncollectability associated with subsidiary cards in situation such as where the subsidiary card is held by a minor or otherwise not legally responsible party. The details of how the responsibility and or liability for spending capacity consumed by the subsidiary card may be determined to satisfy various regulatory and/or practical considerations applicable wherever and however the cards are used and their functions facilitated. For example, it may be desirable to avoid legal collectibility risk associated with debts held by minors and to avoid any regulatory issues in countries that restrict the issuance of credit cards to minors.

As discussed herein, an administrator 330 may issue a subsidiary card account 332 that bears its own spending capacity, i.e., a subsidiary spending capacity, and that is linked to a parent account 315. As described herein, the system of the present invention enables parent 310 to define and change the spending capacities (e.g., credit limits or other mechanisms for approving or denying an individual transaction) for each subsidiary card account 332 or to cancel one or more subsidiary card account 332 altogether. To accommodate the access of subsidiary card account 332 to the subsidiary spending capacity, the original spending power of a parent account 315 is reduced to a modified parent spending power. The difference between the original parent spending power and the modified parent spending power, however, may be less than the subsidiary spending capacity in cases where some of the risk associated with subsidiary card account 332 is assumed by administrator 330. In other words, the sum of the modified parent spending power and the subsidiary spending capacity may be greater than the original parent spending power, the difference being equal to the risk assumed by administrator 330. For example, an original spending power of a parent account 315 set at $9500 may be reduced to $9000 when an administrator 330 issues a subsidiary card account 332 linked to the parent account 315, but the subsidiary card account 332 will have a spending capacity of $1000. In this case, the original spending power of the parent account 315 is decreased by $500 while administrator 330 assumes $500 of risk. Thus, the total spending power for the parent account 315 and the subsidiary card account 332 increases from $9500 to $10000.

It should be noted that the invention contemplates that there may be one or more parent card representing the parent and associated with which there may also be one or more subsidiary card. It should also be noted that each subsidiary card may have associated with it one or more monthly spending limit, whereby a spending limit associated with first subsidiary card may be different from a spending limit associated with a second subsidiary card even though both subsidiary card accounts are associated with the same parent.

In an exemplary embodiment, a spending capacity may be prescribed in terms of one or more currency (e.g., an amount in U.S. dollars, an amount in Japanese yen) and may also be prescribed as a minimum or maximum of amounts described in terms of two or more currencies. For example, in an exemplary embodiment, a spending capacity is described as an amount in Japanese yen so long as that amount is greater than an amount in U.S. dollars. In another exemplary embodiment, a spending capacity is described as an amount in Japanese yen so long as that amount does not exceed an amount in U.S. dollars.

In an exemplary embodiment, a spending capacity may be variable and may be determined according to one or more factors. Exemplary factors may include, one or more currency exchange rates, an age of a subsidiary card holder, a standard cost of living indicator (e.g., consumer price index), the current date, the length of time elapsed from a predetermined date, or the like. In accordance with this embodiment, a spending capacity may be determined, and subsequently redetermined, so as to provide a fixed spending capacity (e.g., $500 per month) in terms of a first currency (e.g., U.S. dollars) for a first period of time (e.g., until the subsidiary card holder's 18th birthday) and then modified so as to provide a revised spending capacity (e.g., ¥100,000 per month) in terms of a second currency (e.g., Japanese yen) for a second period of time (e.g., three months). Accordingly, a subsidiary card may be preconfigured to accommodate the spending of a subsidiary as the subsidiaries spending needs change (e.g., as a minor dependent, as a dependent or employee traveling abroad, as a college student, as an heir).

In addition, where anticipated future expenditures (e.g., tuition) are defined in terms of a first currency (e.g., British pounds) a spending capacity of a subsidiary card may be provided so as to accommodate the anticipated expenditures even though the parent card from which the spending capacity is acquired may be depleted in terms of a second currency (e.g., U.S. dollars). Put another way, the system may optionally be configured to provide the ability for parent to eliminate risks associated with fluctuations in currency exchange rates by committing to fixed automatic long-term charges at a fixed foreign exchange rate for a fixed term. In addition, the system and method of the instant invention may provide the ability to fix the currency exchange rate so as to eliminate, from the perspective of the holder of the parent card, any risk associated with fluctuations in currency exchange rates while, for example, a subsidiary is consuming spending capacity in a currency that is different from the currency used by the holder of the parent card to provide the spending capacity to the subsidiary. For example, the system and method of the instant invention may accommodate a child studying in the U.S. for first time period of 12 months while the parent may budget with the knowledge that in each of the next 12 months, in order to provide $1000 for his child, his card will be billed a fixed amount each month (e.g., where the exchange rate is fixed at a negotiated 120 yen/$, the parent card in Japan may be debited exactly Yen 120,000 each month. Accordingly, the risk that the exchange rate will fluctuate (e.g., rise) may be transferred to the issuer.

In an exemplary embodiment, a spending capacity of parent card account may be periodically decreased by a predetermined amount while the spending capacity of the subsidiary card account is increased by a substantially equivalent amount, such that the subsidiary card account functions substantially as a pre-paid card account. Alternatively, the spending capacity of parent card account may be periodically decreased by an amount substantially equivalent to the spending capacity consumed by the subsidiary card account, such that the subsidiary card account functions as a credit card linked to the parent card account.

With further reference to FIG. 3, an exemplary administrator 330 may be configured to establish more than one subsidiary card account 332 at the request of parent 310, and each subsidiary card account 332 may bear a different credit line than either the parent account 315 or any other subsidiary card account 332. In addition, an exemplary administrator may receive, and facilitate execution of, a request from parent 310 to define, modify, and/or terminate the spending capacity and/or debt accumulation limit for subsidiary card account 332 (e.g., $500.00 spending capacity for a first subsidiary card account 332, $800.00 spending capacity for a second subsidiary card account 332, and $250.00 spending capacity for a third subsidiary card account 332) and/or modified by parent 310.

In accordance with an exemplary embodiment, the system may also be configured to prevent carry-over of credit from one month to the next. In accordance with this embodiment, transactions facilitated by subsidiary card account 332 are permitted until a pre-set spending capacity has been consumed. For example, in an exemplary embodiment, administrator 330 tracks the transactions facilitated by the subsidiary card account 332 to maintain a current account status. Whenever authorization for a particular transaction is requested of the administrator 330, the administrator 330 compares the status that would exist if the transaction were authorized and completed against the permissible status based upon a predetermined set of criteria (e.g., credit line, spending capacity, payment status, creditworthiness). Thus, when the transactions facilitated by a subsidiary card account 332 have reached the spending capacity, or would cause the spending capacity to be exceeded within the predetermined time period, or otherwise violate the predetermined set of criteria, no more charges will be authorized. In accordance with this embodiment, at each cycle cut, available credit is re-set to the pre-defined spending capacity. Thus, in accordance with this embodiment, unused spending capacity from one cycle cannot be used during the following cycle. In the event that the card is configured to accommodate emergency transactions as described herein, however, emergency transactions may be permitted without consuming spending capacity.

Alternatively, the system may be configured to permit carry-over and accumulation of spending capacity from one month to the next. In this embodiment, at the beginning of each cycle cut, additional spending capacity may be added to subsidiary card account 332. In accordance with this embodiment, unused spending capacity from one cycle can be used in subsequent cycles and may be accumulated. In the event that carry over capacity is permitted, the carry over risk is allocated between the parent 310 and the administrator 330 in accordance with a predetermined set of criteria as described above. In accordance with this embodiment, interest may be credited for unused spending capacity.

With respect to applications and account settling, administrator 330 may require both parent 310 and prospective subsidiary 350 to apply for the subsidiary card account 332. Administrator 330 may require information regarding parent 310 to assess qualification for the subsidiary card account 332 (credit history, salary, etc.). Administrator 330 may also require information regarding subsidiary 350 to qualify for a minimum age requirement, to provide information to be embossed on the card, and to provide identification information (e.g., social security number, mother's maiden name, etc.). In addition, administrator 330 may define a maximum pre-set spending capacity, limit, or budget based upon an assessment of the parent's 310 creditworthiness, and subject to a predetermined maximum amount.

It should be noted that the system 300 may at times require acquisition or verification of the identity of parent 310 or subsidiary 350. Administrator 330 may accomplish the process of obtaining and/or verifying the identity of parent 310 or subsidiary 350 through a variety of means that are known in the art including, but not limited to, use of private databases, credit bureau databases, transmission of biometric data, transmission of "hand-shake" data (i.e., smart card signature, challenge/response, etc) and/or the like. Examples of online authentication are disclosed in U.S. Ser. No. 09/952,490 "Microchip-Enabled Online Transaction System", filed Aug. 16, 2001, with inventors Anant Nambiar and Geoffrey Stern, which is hereby incorporated by reference. Thus, the authentication information is collected for the purpose of establishing the subsidiary card account 332 and defining its ownership. It should be noted that, although the instant invention may be embodied as a microchip enabled device, it may also be configured as a virtual and not a physical (e.g., plastic) account, which may not accommodate a microchip.

In accordance with the present invention, an exemplary system is configured to facilitate communication between parent 310, a subsidiary 350, and an administrator 330 regarding the status (e.g., transactions, accrued interest, balances, available credit, payments, billings, etc.) of subsidiary account 332 and a parent account 315. In accordance with an exemplary embodiment, administrator 330 may communicate statements or transaction reports to both parent 310 and subsidiary 350. Accordingly, subsidiary 350 may monitor transactions and dispute charges if necessary. In addition, administrator 330 may enable parent 310 to monitor the amount of spending capacity consumed by subsidiary 350. As discussed herein, the levels of detail provided in such statements 334 may be configured by parent 310, subsidiary 350, or both. For example, in an exemplary embodiment, parent 310 could switch off or on the receipt of the spending details of the various subsidiary accounts. This may be useful, for example, in a case where a parent has two subsidiary accounts, one for each of two children, e.g., one for a junior high school son, for whom this card is a financial management learning tool, and another for a 24 year old daughter, studying as a graduate student in the United States. In such a case, the parent may want the ability to review the younger boy's spending, but may want to forgo that level of detail for the daughter, since the purpose of the card in her case is simply to provide access to funds, rather than to monitor spending.

Further, whenever parent 310 has modified the spending capacity of subsidiary card account 332, administrator 330 may be configured to notify subsidiary 350 through subsidiary statement 336. Based upon the parent statement 334, parent 310 may remit payment 314 to administrator 330, or a designee of administrator 330.

Accordingly, an exemplary administrator 330 is configured to generate a parent account statement 334 for the parent account 315. In addition, administrator 330 is configured to dispatch additional statements 336 for each subsidiary card account 332 to each designated subsidiary 350. The subsidiary account statements 336 may be dispatched to individual designated addresses such as the separate addresses of the individual subsidiaries 350. Moreover, administrator 330 is configured to charge, i.e., adjust, the parent account 315 spending power based on the spending capacity advanced to and consumed by each of the subsidiaries 350. In an exemplary embodiment, the statement 334 provided to parent 310 regarding the activity of each subsidiary 350 is limited to the aggregate sum owed. Alternatively, the statements 334 may include additional information regarding the activities of each subsidiary 350 may be provided depending upon the wishes of parent 310 and/or each subsidiary 350. Administrator 330 may provide various levels of control to parent 310 and/or various levels of independence and privacy to subsidiary 350 through this mechanism. Finally, administrator 330 is configured to manage and track the balances of each parent account 315 and each subsidiary card account 332 in accordance with the activities transacted using each account (e.g., purchases, cash advances, interest accrued, payments made, credit limits modified, spending capacities, etc.).

Figure 4:
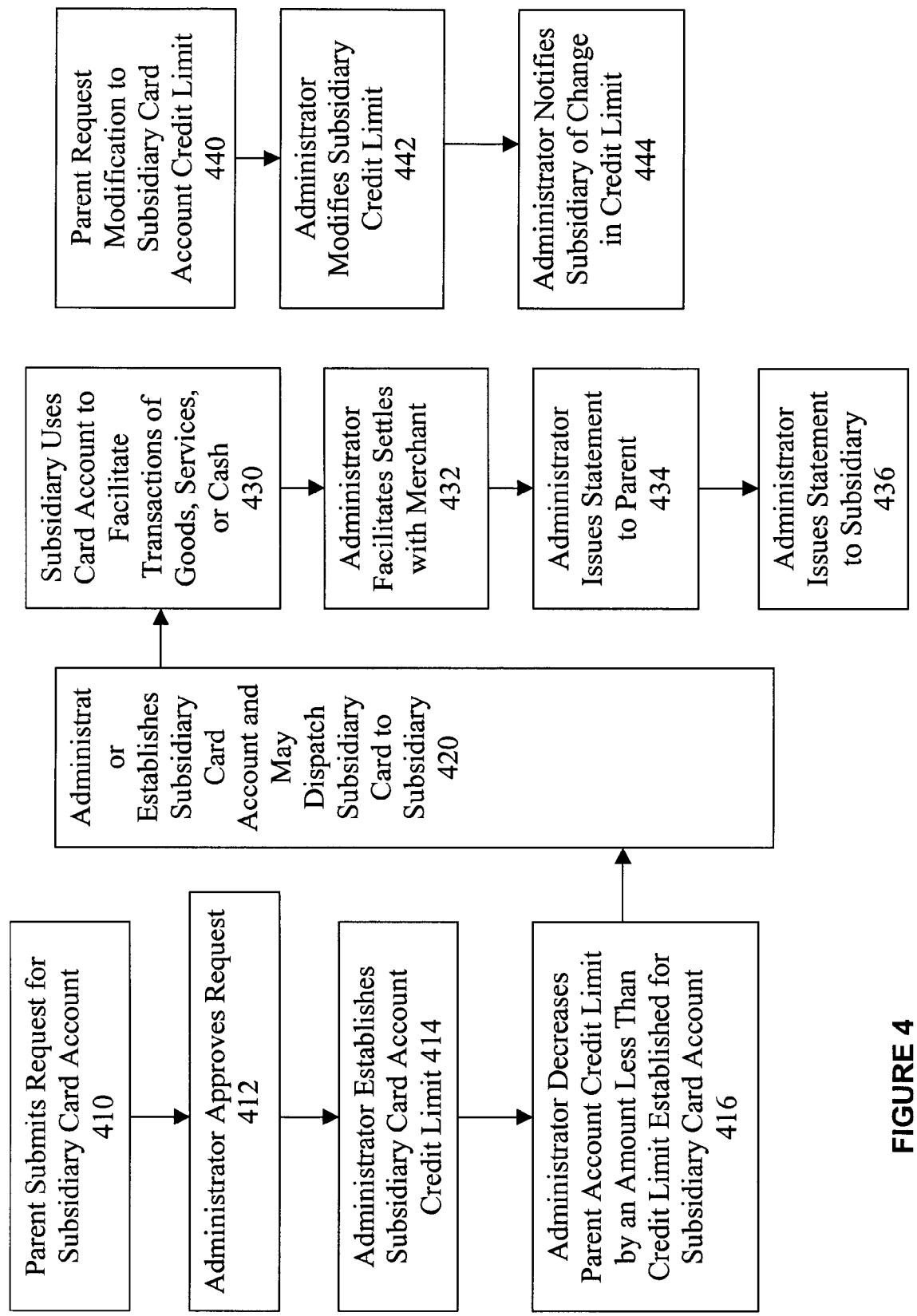
FIG. 4 illustrates an exemplary administrator configured to administer a flexible limit subsidiary card account.

FIG. 4 illustrates an exemplary administrator 330 configured to administer a flexible limit subsidiary card account 332. In accordance with this embodiment, administrator 330 is configured to facilitate communication between parent 310, a subsidiary 350, and a merchant 370 regarding the status (e.g., transactions, accrued interest, balances, available credit, payments, billings, etc.) of subsidiary account 332 and a parent account 315. In accordance with this embodiment, administrator 330 comprises an account administrator 430, a transaction administrator 440, a settler 450, and a statement generator 460.

In an exemplary embodiment, account administrator 430 is configured to receive a request from parent 310 and to facilitate the establishment, issuance and administration of one or more subsidiary card account 332 so that it may be used by the subsidiary 350 to facilitate transactions. In addition, account administrator 430 is configured to facilitate determination and adjustment of appropriate spending powers for the parent account 315 and the subsidiary card account 332 in accordance with a predetermined set of rules. Accordingly, account administrator 430 is configured to receive and facilitate execution of a request from a parent 310 to define, modify, and/or terminate the spending and/or debt accumulation limits for the subsidiary card account 332 and to charge, i.e., adjust, the parent account 315 spending power based on the credit advanced to and consumed by each of the subsidiaries 350. Further, account administrator 430 is configured to manage and track the balances of each parent account 315 and each subsidiary card account 332 in accordance with the activities transacted using each account (e.g., purchases, cash advances, interest accrued, payments made, credit limits modified, spending capacities, etc.). In the event parent 310 fails to remit payment as promised, account administrator 430 is configured to place a hold on subsidiary card account 332.

In an exemplary embodiment, transaction administrator 440 is configured to facilitate transactions until a pre-set spending capacity has been consumed. Accordingly, transaction administrator 440 is configured to limit total spending. In addition, transaction administrator 440 may be configured to limit spending for specific classes of goods and/or services, to limit spending at specific classes of merchants or service providers, or to limit spending at specifically identified merchants or service providers. Moreover, where specific restrictions exist to condition the use of the parent account 315, the transaction administrator may be configured to enforce those restrictions against any associated subsidiary card account 332. Finally, transaction administrator 440 may be configured to accommodate emergency transactions in accordance with predefined criteria, e.g., specific medical service providers or pharmacies.

In an exemplary embodiment, settler 450 is configured to provide a settling payment to merchant 370. In addition, settler 450 is configured to arbitrate disputed transactions associated with subsidiary card account 332 directly with subsidiary 350 and merchant 370.

In an exemplary embodiment, statement generator 460 is configured to generate a parent account statement 334 for the parent account 315 and to dispatch additional statements 336 for each subsidiary card account 332 to each designated subsidiary 350.

It should be noted that the system of the instant invention may also incorporate features to facilitate additional security benefits. While these features may take many forms that may be appreciated by one of ordinary skill in the art, an exemplary system includes a card replacer that may be activated to replace a parent card or a subsidiary card. In addition, a customer service engine may be configured to receive a message from a parent or a subsidiary through any means known in the art, such as a telephone call or an e-mail message or another message transmitted, for example, through the internet. Customer service engine may also be configured to verify the identity of the message sender, e.g., a parent or a subsidiary, to verify the authority of the message sender to request a service, i.e., emergency card replacement, and to determine the appropriate responsive action, such as requesting that the card replacer send the requester a replacement card. As a result, additional security benefits are realized by the consumer.

Figure 5:
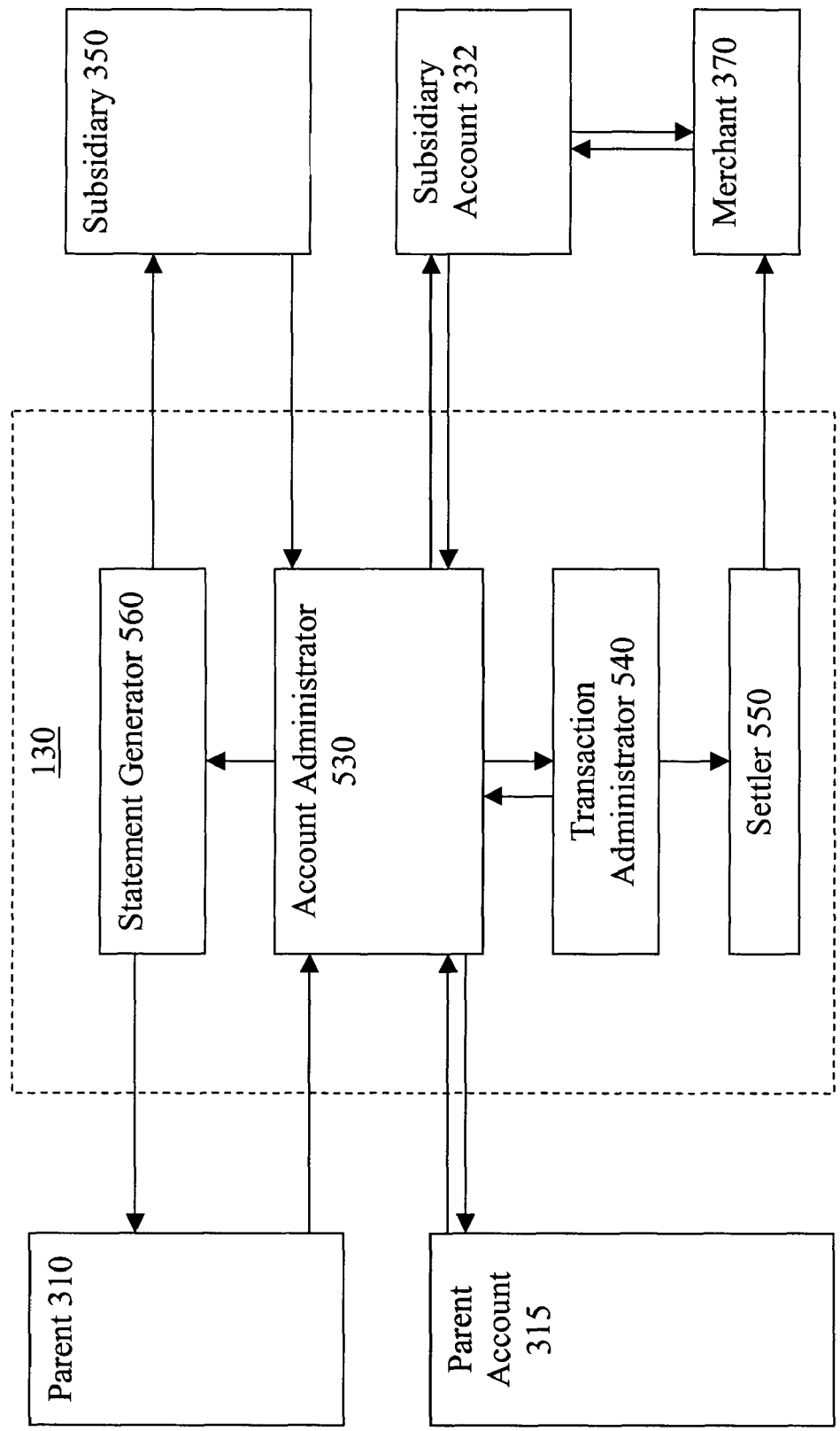
FIG. 5 illustrates an exemplary process for administering a flexible limit subsidiary card account.

FIG. 5 illustrates an exemplary process for administering a flexible limit subsidiary card account 332. In accordance with this embodiment, a parent 310 submits a request 312, via facsimile, telephone, internet or any other means known in the art, for a subsidiary card account 332 to an agent, delegate, or affiliate of the administrator (step 510). The request 312 may include information sufficient to identify and verify the identity of the parent 310 and the subsidiary 350 (e.g., name, address, social security number, mother's maiden name, telephone number). The request 312 may also include information necessary to configure a subsidiary card account 332 such as desired spending capacity, credit line, restricted merchants 370 or classes of merchants, emergency enabled merchants or classes of merchants for whom the spending capacity may be extended or waived, and whether carry-over is enabled. In response, administrator 330 may approve or refuse the request based upon a predetermined set of criteria such as credit worthiness or payment history of the parent 310 (step 512). If administrator 330 approves the request 312, administrator 330 establishes subsidiary card account 332 and a subsidiary spending capacity (step 514). The subsidiary card account 332 and the parent account 315 are linked in that the parent account 315 remains responsible for transactions facilitated by the subsidiary card account 332 and in that the parent 310 may access account and transaction information related to the subsidiary card account 332. To accommodate the provision of credit to subsidiary 350, administrator 330 decreases the spending power of the parent account 315 in accordance with a predetermined set of rules, for example, by an amount less than the amount of credit provided to subsidiary 350 (step 516). Accordingly, administrator 330 accepts some risk for the extension of credit to subsidiary 350. In the event of non-payment for transactions facilitated by the subsidiary card account, a hold may be placed upon both the parent account 315 and the subsidiary card account 332. Ultimately, the parent 310 is responsible for all transactions facilitated by the subsidiary card account. Finally, administrator 330 dispatches tangible indicia of subsidiary card account 332, such as a plastic card, to subsidiary 350 (step 520).

If approved, the system issues a card to subsidiary 350 as well as a PIN number or other system and method for verifying the identity of, i.e., authenticating, the user at, for example, an ATM. Upon receipt of the card, before use, the system may require the card member to activate subsidiary card account 332 (e.g., sign the card and/or place a telephone call to a predetermined number). Once subsidiary card account 332 has been activated, subsidiary 350 may use the card account 332 throughout the cycle period to facilitate on-line and off-line transactions at permissible merchants 370 or to conduct withdrawals of cash at ATMs until the pre-set spending capacity has been reached.

Upon establishment of the subsidiary card account 332, subsidiary 350 may use the subsidiary card account 332 to facilitate purchases of goods and/or services 372 or may access ATMs for cash (step 530) using known in the art systems and methods. After subsidiary 350 uses the subsidiary card account 332, administrator 330 provides a settling payment 338 to merchant 370 using any appropriate settlement procedures known in the art (step 532). In addition, administrator 330 prepares and issues a statement to parent 310 reflecting the activity of subsidiary 350 using the subsidiary card account 332 (step 534). In an exemplary embodiment, a typical statement generator and printer are utilized to produce a consolidated statement containing account and transaction data for both the parent account 315 and the subsidiary card account 332. Finally, administrator 330 prepares and issues a statement to subsidiary 350 reflecting the activity on the subsidiary card account 332 for that cycle (step 536).

In the beginning of cycle, the parent account 315 is debited with the monthly budget allocated to the subsidiary card account 332, and the subsidiary card account 332 is credited with a corresponding value. Card account 332 usage is then permitted during the cycle up to the spending capacity to facilitate subsidiary transactions such as spending at a merchant 370 or a withdrawal of cash at an ATM.

At the end of the cycle, the issuer provides a statement to parent 310. The statement includes the spending capacity (a.k.a. budget) that was allocated to subsidiary 350 at the beginning of the cycle. Changes to the spending capacity are accomplished where, first, parent 310 desired to effect a change, second, communicates a request to the issuer (e.g., via telephone or on-line), third, the issuer approves the request, and fourth, implements the change.

At cycle cut, the system provides a billing statement reflecting the charges made by subsidiary 350 to parent 310, either in a consolidated form with the statement for the parent account 315 or as a stand alone statement. Also, the system updates the spending capacity in accordance with the agreement with parent 310 (e.g., reflecting carry-over designations, charges made, payments made, interest accrued, adjustments to the spending capacity, and the like).

Once one or more subsidiary card account 332 has been established, the charges for each subsidiary card account 332 may be billed, for example, on a periodic (e.g., monthly) basis to, for example, the parent account 315 or a company's account or a predetermined bank account for direct payment. Parent 310 may pay the charges on the subsidiary card account 332 on a periodic (e.g., monthly) basis through any available funding vehicle (e.g., credit card, debit card, bank account, cash) or any combination thereof.

The system may also be configured to allow parent 310 to modify the spending capacities of the subsidiary card account 332 or to cancel subsidiary card account 332 altogether. In the event that parent 310 wishes to modify the spending capacity of subsidiary card account 332, parent 310 may communicate a request to administrator 330 via facsimile, internet, telephone or other method known in the art (step 540). Once administrator 330 has received the request, administrator 330 may then modify the spending capacity of subsidiary card account 332 in accordance with a predetermined allocation of risk (step 542), and may notify subsidiary 350 of the modification (step 544) by facsimile, telephone, internet e-mail, courier, standard mail or other means known in the art.

In addition, the system is configured to enable parent 310 to modify the pre-set spending capacity upon the request of parent 310. In situations where parent 310 would like to change spending capacitys, or cancel card account 332, parent 310 communicates the request to the administrator via telephone call to a predefined telephone number or via on-line request. In response, administrator 330 approves the request and accomplishes the modification.

In accordance with an exemplary embodiment, the system facilitates the application and card account 332 establishment process. The system also tracks card account 332 usage and payments, and tracks the outstanding balance relative to the pre-set spending capacity. In accordance with this embodiment, the application and card account 332 establishment process begins when parent 310 and a potential subsidiary apply for a card account 332 by transmitting application information to an administrator. The application information may include information identifying parent 310 (e.g., personal details regarding parent 310, account number of parent account 315), information identifying subsidiary 350 (e.g., personal details regarding subsidiary 350), information defining the desired characteristics of the subsidiary card account 332 (e.g., desired spending capacity, allowable carry-over from cycle to cycle, limited or forbidden merchants 370, and the like), and acceptance of terms (e.g., agreement of responsibility).

In the event that parent 310 elects to cancel the parent account 315, administrator 330 will also cancel any subsidiary account 332 linked to the cancelled account, unless parent 310 provides another form of security for the subsidiary account 332. If the subsidiary account 332 has a positive balance at the time it is cancelled, administrator 330 will refund the positive balance to parent 310. Administrator 330 is also configured to accommodate disputed transactions associated with subsidiary card account 332 directly with subsidiary 350. In the event parent 310 fails to remit payment to administrator 330 as promised, administrator 330 is configured to place a hold on account 332.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneier, which is entitled "Applied Cryptography: Protocols, Algorithms, And Source Code In C," published by John Wiley & Sons (second edition, 1996), which is hereby incorporated by reference.

Other systems that may be integrated with, or layered on, the present invention include, for example, other loyalty systems, transaction systems, electronic commerce systems and digital wallet systems such as, for example, the Shop AMEX™ system as disclosed in Ser. No. 60/230,190 filed Sep. 5, 2000; the MR as Currency™ and Loyalty Rewards Systems disclosed in Ser. No. 09/834,478 filed on Apr. 13, 2001; a Digital Wallet System disclosed in U.S. Ser. No. 09/652,899 filed Aug. 31, 2000; a Stored Value Card as disclosed in Ser. No. 09/241,188 filed on Feb. 1, 1999; a System for Facilitating Transactions Using Secondary Transaction Numbers disclosed in Ser. No. 09/800,461 filed on Mar. 7, 2001; Methods and Apparatus for Conducting Electronic Transactions disclosed in Ser. No. 60/232,040 filed Sep. 12, 2000, all of which are hereby incorporated by reference. Other examples of online reward or incentive systems are disclosed in U.S. Pat. No. 5,774,870, issued on Jun. 30, 1998, and U.S. Pat. No. 6,009,412, issued on Dec. 29, 1999, both of which are hereby incorporated by reference. Additional information relating to smart card and smart card reader payment technology is disclosed in Ser. No. 60/232,040, filed on Sep. 12, 2000, and U.S. Pat. Nos. 5,742,845; 5,898,838 and 5,905, 908, owned by Datascape; which are hereby incorporated by reference. Moreover, additional information related to online privacy and anonymity systems may be found at www.PRIVADA.COM, which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, an integrated circuit, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g.; systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create system and method for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of system and method for performing the specified functions, combinations of steps for performing the specified functions, and program instruction for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method comprising:

allocating, by a computer based system for administering a subsidiary account, a first credit line to the subsidiary account, wherein the first credit line is at least a portion of an available credit line of a parent account, and wherein the first credit line is provided by a first account issuer;

authorizing, by the computer based system, a second credit line associated with the subsidiary account and provided by a second account issuer, wherein the second account issuer is situated in a second country that is different from a first country associated with the first account issuer;

defining, by the computer based system, a subsidiary account spending capacity based on a currency of the first country, the first credit line, and the second credit line;

determining, by the computer based system, an exchange rate corresponding to the currency of the first country and a currency of the second country distinct from the first country;

determining, by the computer based system, an effective time period associated with the exchange rate;

authorizing, by the computer based system, a purchase with a subsidiary account, wherein purchases made using the subsidiary account are limited by the subsidiary account spending capacity, and wherein, during the effective time period, purchases made using the subsidiary account in the currency of the second country are converted into the currency of the first country according to the exchange rate; and accommodating, by the computer based system, an emergency transaction in accordance with predefined criteria by allowing the subsidiary account to exceed the subsidiary account's defined spending capacity.

2. The method according to claim 1, wherein the parent account is established by the first account issuer and the subsidiary account is at least partially maintained by the second account issuer.

3. The method of claim 1, further comprising modifying, by the computer based system, the subsidiary account spending capacity in response to a request from the parent system.

4. The method of claim 3, further comprising modifying, by the computer based system, the available credit line of the parent account based on a modification of the subsidiary account spending capacity.

5. The method of claim 1, further comprising tracking, by the computer based system, spending incurred using the subsidiary account.

6. The method of claim 1, further comprising limiting, by the computer based system, total spending incurred using the subsidiary account.

7. The method of claim 1, further comprising limiting, by the computer based system, spending incurred using the subsidiary account for a specific class of goods or services.

8. The method of claim 1, further comprising limiting, by the computer based system, spending incurred using the subsidiary account at a specific class of merchants.

9. The method of claim 1, further comprising limiting, by the computer based system, spending incurred using the subsidiary account at a specific merchant.

10. The method of claim 1, further comprising enforcing, by the computer based system, specific restrictions against the subsidiary account, wherein the specific restrictions condition the use of the parent account.

11. The method of claim 1, further comprising generating, by the computer based system, a statement for the subsidiary account.

12. The method of claim 1, further comprising generating, by the computer based system, a statement for the parent account.

13. The method of claim 1, further comprising terminating, by the computer based system, the subsidiary account in response to a request from the parent system.

14. The method of claim 1, wherein the subsidiary account is configured to carry-over spending capacity from one cycle to the next.

15. The method of claim 1, wherein the subsidiary account is configured to prevent carry-over of spending capacity from one cycle to the next.

16. The method of claim 1, further comprising reducing, by the computer based system, the available credit line of the parent account by the first amount.

17. A tangible non-transitory computer-readable storage medium having computer-executable instructions stored thereon that, if executed by a computer based system for administering a subsidiary account, cause the computer based system to perform operations comprising:

allocating, by the computer based system, a first credit line to the subsidiary account, wherein the first credit line is at least a portion of an available credit line of a parent account, and wherein the first credit line is provided by a first account issuer;

authorizing, by the computer based system, a second credit line associated with the subsidiary account and provided by a second account issuer, wherein the second account issuer is situated in a second country that is different from a first country associated with the first account issuer;

defining, by the computer based system, a subsidiary account spending capacity based on a currency of the first country, the first credit line, and the second credit line;

determining, by the computer based system, an exchange rate corresponding to the currency of the first country and a currency of the second country distinct from the first country;

determining, by the computer based system, an effective time period associated with the exchange rate;

authorizing, by the computer based system, a purchase with a subsidiary account, wherein purchases made using the subsidiary account are limited by the subsidiary account spending capacity, and wherein, during the effective time period, purchases made using the subsidiary account in the currency of the second country are converted into the currency of the first country according to the exchange rate; and accommodating, by the computer based system, an emergency transaction in accordance with predefined criteria by allowing the subsidiary account to exceed the subsidiary account's defined spending capacity.

18. A computer based system for administering a subsidiary account comprising:

a network interface communicating with a memory;

the memory communicating with a processor; and the processor, when executing a computer program, is configured to:

allocate, by the processor, a first credit line to the subsidiary account, wherein the first credit line is at least a portion of an available credit line of a parent account, and wherein the first credit line is provided by a first account issuer;

authorize, by the processor, a second credit line associated with the subsidiary account and provided by a second account issuer, wherein the second account issuer is situated in a second country that is different from a first country associated with the first account issuer;

define, by the processor, a subsidiary account spending capacity based on a currency of the first country, the first credit line, and the second credit line;

determine, by the processor, an exchange rate corresponding to the currency of the first country and a currency of the second country distinct from the first country;

determine, by the processor, an effective time period associated with the exchange rate;

authorize, by the processor, a purchase with a subsidiary account, wherein purchases made using the subsidiary account are limited by the subsidiary account spending capacity, and wherein, during the effective time period, purchases made using the subsidiary account in the currency of the second country are converted into the currency of the first country according to the exchange rate; and accommodate, by the processor, an emergency transaction in accordance with predefined criteria by allowing the subsidiary account to exceed the subsidiary account's defined spending capacity.

* * * * *